US011332190B1

(12) United States Patent
Shepherd

(10) Patent No.: US 11,332,190 B1
(45) Date of Patent: May 17, 2022

(54) TRIM LOCK AND CENTERING ASSEMBLY WITH TRIM LOCK

(71) Applicant: John D. Shepherd, Gaylord, MI (US)

(72) Inventor: John D. Shepherd, Gaylord, MI (US)

( * ) Notice: Subject to any disclaimer, the term of this patent is extended or adjusted under 35 U.S.C. 154(b) by 0 days.

(21) Appl. No.: 17/351,602

(22) Filed: Jun. 18, 2021

(51) Int. Cl.
| | |
|---|---|
| *B62D 6/04* | (2006.01) |
| *B62D 7/22* | (2006.01) |
| *B62D 7/16* | (2006.01) |
| *B62D 5/06* | (2006.01) |
| *F16F 9/02* | (2006.01) |
| *F16F 13/00* | (2006.01) |

(52) U.S. Cl.
CPC ............. *B62D 7/222* (2013.01); *B62D 5/062* (2013.01); *B62D 6/04* (2013.01); *B62D 7/16* (2013.01); *B62D 7/22* (2013.01); *F16F 9/0245* (2013.01); *F16F 13/005* (2013.01)

(58) Field of Classification Search
CPC .......... B62D 7/222; B62D 5/062; B62D 6/04; B62D 7/16; B62D 7/22; F16F 9/0245; F16F 13/005
See application file for complete search history.

(56) References Cited

U.S. PATENT DOCUMENTS

| | | | |
|---|---|---|---|
| 1,745,117 A | 1/1930 | Plank | |
| 2,588,682 A | 3/1952 | Wyeth | |
| 4,359,123 A | 11/1982 | Haupt et al. | |
| 4,406,473 A | 9/1983 | Sexton | |
| 4,736,931 A | 4/1988 | Christopherson | |
| 4,822,012 A | 4/1989 | Sketo | |
| 4,925,165 A | 5/1990 | Sketo | |
| 5,220,706 A | 6/1993 | Bivens | |
| 5,364,114 A | 11/1994 | Petersen | |
| 5,620,194 A | 4/1997 | Keeler et al. | |
| 5,896,959 A | 4/1999 | Jeffries et al. | |
| 6,126,154 A | 10/2000 | Shepherd | |
| 6,237,904 B1 | 5/2001 | Shepherd | |
| 6,530,585 B1 | 3/2003 | Howard | |
| 6,609,766 B1 | 8/2003 | Chesnut | |
| 6,698,777 B1 | 3/2004 | Shepherd | |

(Continued)

OTHER PUBLICATIONS

Copenheaver, Blaine R., International Search Report and Written Opinion issued by the International Searching Authority for corresponding PCT Application No. PCT/US2018/036694, dated Aug. 24, 2018.

*Primary Examiner* — Thomas W Irvin
(74) *Attorney, Agent, or Firm* — Greer Burns & Crain, Ltd

(57) ABSTRACT

A trim lock and a centering assembly that provides a centering force between a first portion of a system and a second portion of the system. The centering assembly includes a centering stabilizer that provides a centering force along an axial direction thereof, a trim lock configured and arranged to change a location of one axial end of the centering stabilizer, with respect to the second portion of the system, between an original location and an adjusted location, and to lock the axial end of the centering stabilizer at the adjusted location, a connecting unit for operatively connecting the trim lock with the centering stabilizer, and a mounting member for movably mounting the centering stabilizer with respect to the second portion of the system, wherein the mounting member permits axial movement of the centering stabilizer with respect to said second portion of the system.

20 Claims, 20 Drawing Sheets

(56) References Cited

U.S. PATENT DOCUMENTS

| | | |
|---|---|---|
| 6,773,002 B2 | 8/2004 | Adoline et al. |
| 6,817,620 B1 | 11/2004 | Howard |
| 7,066,455 B2 | 6/2006 | Adoline et al. |
| 7,207,579 B1 | 4/2007 | Howard |
| 7,207,580 B2 | 4/2007 | Howard |
| 7,401,677 B2 | 7/2008 | Boyle et al. |
| 8,141,667 B2 | 3/2012 | Shepherd et al. |
| 8,459,400 B2 | 6/2013 | Dillard |
| 8,540,257 B1 | 9/2013 | Merchant et al. |
| 8,733,771 B2 | 5/2014 | Johnson et al. |
| 10,099,530 B2 | 10/2018 | Grimes |
| 10,328,971 B1 | 6/2019 | Shepherd |
| 10,683,033 B2 * | 6/2020 | Shepherd ................ F16F 1/041 |
| 2002/0140197 A1 | 3/2002 | Howard |
| 2004/0188968 A1 | 9/2004 | Warner |
| 2012/0091678 A1 * | 4/2012 | Buttner ..................... F16F 9/26 |
| | | 280/90 |
| 2019/0210646 A1 * | 7/2019 | Shepherd .............. B62D 7/228 |

* cited by examiner

TRIM LOCK AND CENTERING ASSEMBLY WITH TRIM LOCK

The present invention relates generally to devices, systems and methods that provide a centering force, or a steering assist force, to a steering system of a vehicle, and more particularly to devices, systems and methods that involve devices that combine a component that creates a pushing force with a component that creates a pulling force, in certain embodiments, or with devices that create a return-to-center force with even a slight displacement from the center.

The present invention also relates to gas spring devices that incorporate a pull-type gas spring (also referred to as a traction gas spring) and a push-type gas spring into a single unit. Such devices could be used as part of the steering system of a vehicle. Alternatively, such devices could also be used in other applications not related to vehicle steering systems, such as with two-way doors, gates, hatches, etc.

The present invention also relates to a trim lock for locking a centering stabilizer, such as the spring devices and other stabilizing devices disclosed herein, in place, and for allowing on the fly adjustment of one of the axial ends of the centering stabilizer.

Finally, the present invention relates to a centering assembly incorporating a centering stabilizer, such as the spring devices and other stabilizing devices disclosed herein, and a trim lock for allowing on the fly adjustment of one of the axial ends of the centering stabilizer and for locking the axial end in the modified location.

BACKGROUND OF THE INVENTION

Steering assist members, also referred to as steering stabilizers, are known components of the steering system of a vehicle. Such members enable the steering system to counteract various interferences encountered when driving, such as potholes, uneven pavement, off-road obstacles, a blown tire, sudden wind gusts, etc., which would otherwise force the vehicle to deviate from the driver's desired straight-ahead trajectory. The steering assist member is intended to correct the steering of the vehicle under such circumstances by providing a force that returns the steering system to the driver's desired path, such as along a straightaway, by providing a return-to-center force.

Some prior art units only provide damping, and lack the desired additional force provided by return-to-center units. However, many of the available return-to-center units only provide very low forces near the center position, with ramped-up forces only being applied during bigger turns. Thus, smaller interferences are not corrected for by such units.

Accordingly, there is a need for a device that can provide return-to-center features with essentially any move off center. In other words, it would be desirable to have a unit that provides full pressure, or nearly full pressure, with even slight movements off center, or to have a unit that at least provides sufficient return to center force at slight deviations of the relevant portions of the steering assembly (such as deviations of less than 2 mm).

BRIEF SUMMARY OF THE INVENTION

Disclosed herein, and in the associated drawings, are various embodiments of a new steering stabilizer, alternately referred to as a steering assist member, as well as examples of steering systems in which the steering assist member can be used. Various embodiments of present invention include return-to-center features, and have full pressure, or nearly full pressure, or at least sufficient centering pressure, with essentially any move off center. The embodiments described herein are much less complicated than many prior art devices, and they are much better than current products on the market that only provide damping. The embodiments described herein are also better than the prior art coil spring products that can only provide very low forces at the center position and that only provide ramped-up pressure as larger turns are made. Higher pressure is needed at any movement off-center to resist road hazards or wind, and such higher pressure is provided by the present invention. Coil spring units have very little pressure until reaching a displacement of one inch or more, and that much movement only generally occurs in slow speed turns. The present invention provides a real solution that can work for all stabilizer applications, large or small.

Unlike some of the current very large units for class A RV's, the new unit of the present invention is relatively small. For example, for class C RV's and Jeep brand vehicles, the present invention could have a 1½" OD (outer diameter) and be approximately 20" long. Only when tie rod travel gets longer will the unit grow longer, but not bigger in diameter. The units are so small they can be a directly bolted in replacement on most Class C RV's and Jeeps, as well as many trucks such as Ford F-150 thru the F-450 series and van-based commercial conversions using Ford E-150 thru E-450 like ambulances.

The market for the new unit is very large, including large Class A RV's to Class C RV's and small gas Class A's, among others. Such vehicles are some of the units that need the most help because they are essentially very large boxes, which are lightweight, and thus are easily affected by adverse wind and road conditions.

Many prior art coil-over and coil spring steering stabilizers have no pressure at center, and relatively small pressure in the first ¼ to ⅜ inch of tie rod travel (perhaps only about 10 to 30 pounds of force for a small unit, or about 40-70 pounds for a relatively large unit). Testing of the tie rod on highway and off-road action shows that at any speed over 2-3 miles per hour, the tie rod is moving only a relatively small amount. Thus, coil-overs do nothing to help the driver in 99% of driving situations (although they are great in parking lot demonstrations with full turns of the wheel).

Embodiments of the present new device start with sufficient design pressure (80 pounds, 100 pounds, 150 pounds, 200 pounds, etc.) from zero, and then with any movement of tie rod over 2 mm, they provide full holding pressure as an assist. Essentially all prior art shock-based stabilizers/dampers, regardless of price, are valved 50:50, and are just dampers that resist movement using stiffness (restriction) after motion is started. They have zero centering or return-to-center ability. One of the advantages of the present invention is that provides complete control before an outside force tries to make the steering linkage move, not after it has moved.

Tests of embodiments of the present invention on lifted and modified vehicles, both off road and on highway, have shown that drivers prefer the present invention over popular coil-over devices because, for example, the coil-over devices can have a floaty center point due to lack of spring pressure. Tests of the new unit have been conducted on sand and mud, including in vehicles modified with a long arm lift kit. The long arm modification is a fairly serious off-road modification. Vehicles with big tires tend to dart significantly in sand and mud because they follow the contours.

The unit of the invention eliminated darting, and even made the handling highly improved, by providing improved control and better tracking. In certain situations, hands-free steering is even possible, even over rough, rutted terrain, due to the strong return-to-center forces provided by the present device.

More specifically, the present invention provides a centering stabilizer including a first section that produces a pulling force along a longitudinal axis; a second section that produces a pushing force along a longitudinal axis; and connecting means that connects the first and second sections such that the longitudinal axis of the first section is aligned with the longitudinal axis of the second section. The stabilizer also includes first mounting means attached to the first section, wherein the first mounting means securely attaches the centering stabilizer to a first portion of a steering system of a vehicle, and second mounting means attached to the second section, wherein the second mounting means securely attaches the centering stabilizer to a second portion of the vehicle, wherein when the set of steerable wheels of the vehicle are displaced from a straight ahead driving position, a distance between the first portion of the vehicle steering system and the second portion of the vehicle changes.

Additionally, the present invention also relates to a system for centering and stabilizing a set of turning wheels of a vehicle, wherein the system comprises: a steering linkage member that is configured and arranged to provide a steering motion to a set of steerable wheels; and a steering assist member that includes one end operatively attached to a first portion of the steering linkage member and another end attached to a second portion of the vehicle, wherein when the set of steerable wheels are displaced from a straight ahead driving position, a distance between the first portion of said steering linkage member and said second portion of the vehicle changes. Preferably, the steering assist member includes: a first section configured and arranged to produce a pulling force along a longitudinal axis thereof, wherein the first section extends between two longitudinal ends that are defined as a first proximal end and a first distal end; a second section configured and arranged to produce a pushing force along a longitudinal axis thereof, wherein the second section extends between two longitudinal ends that are defined as a second proximal end and a second distal end; and connecting means configured and arranged to connect the first proximal end to the second proximal end such that the longitudinal axis of the first section is aligned with the longitudinal axis of the second section.

Additionally, the present invention also relates to a vehicle comprising: a vehicle frame; a pair of wheel hubs configured and arranged to be turned with respect to the vehicle frame, wherein the pair of wheel hubs are defined as a left wheel hub and a right wheel hub; a right steering knuckle operatively connected to the right wheel hub, wherein the right wheel hub is configured and arranged to rotate with respect to the right steering knuckle; and a left steering knuckle operatively connected to the left wheel hub, wherein the left wheel hub is configured and arranged to rotate with respect to the left steering knuckle. The vehicle also includes a right outer tie rod operatively connected to the right steering knuckle via a right tie rod end; a left outer tie rod operatively connected to the left steering knuckle via a left tie rod end; and a center link operatively connected to both the right outer tie rod and the left outer tie rod. The steering assist member has a first end connected to the vehicle frame and a second end securely connected to the center link, wherein the steering assist member provides a predetermined maximum return-to-center force, and further wherein at least two-thirds of the predetermined maximum return-to-center force is applied when said steering assist member is displaced along its central axis by 2 mm.

The present invention also relates to a centering stabilizer that includes a first section configured and arranged to produce a pulling force along a longitudinal axis thereof and a second section configured and arranged to produce a pushing force along a longitudinal axis thereof, wherein the first section and the second section are configured and arranged such that the longitudinal axis of the first section is aligned with the longitudinal axis of the second section. There is also preferably a first mounting means attached to a first distal end of the centering stabilizer, wherein the first mounting means is configured and arranged to securely attach the centering stabilizer to a first portion of a steering system of a vehicle, and further wherein the first portion of the vehicle steering system is configured and arranged to move in association with a set of steerable wheels; and a second mounting means attached to a second distal end of the centering stabilizer, wherein the second mounting means is configured and arranged to securely attach the second section of the centering stabilizer to a second portion of the vehicle, wherein when the set of steerable wheels are displaced from a straight ahead driving position, a distance between the first portion of said vehicle steering system and said second portion of the vehicle changes.

In certain embodiments of the centering stabilizer according to the previous paragraph, the first section comprises a gas push-type spring, and the second section comprises a gas traction spring. In other embodiments of the centering stabilizer according to the previous paragraph, the first section comprises a compression coil spring, and the second section comprises a tension coil spring. Further, certain embodiments may include a combination of components in which at least one of the first section and the second section comprises a gas spring. In various embodiments related to the previous paragraph, the longitudinal axis of the first section and the longitudinal axis of the second section are aligned along a central axis. Optionally, the stabilizer may include a single piston rod extending within both the first section and the second section. As another option, the stabilizer may consist of a single housing associated with both the first section and the second section, where the single housing is divided by a dividing member into a first chamber, which is associated with the first section, and a second chamber, which is associated with the second section. Further, the first chamber may be further divided into two sections, a first section that is filled with a pressurized gas and a second section that is not under pressure, and the second chamber may be filled with a pressurized gas.

The present invention also relates to a system for centering and stabilizing a set of turning wheels of a vehicle, wherein the system comprises: a steering linkage member that is configured and arranged to provide a steering motion to a set of steerable wheels; and a steering assist member that includes one end operatively attached to a first portion of the steering linkage member and another end attached to a second portion of the vehicle. When the set of steerable wheels are displaced from a straight ahead driving position, a distance between the first portion of the steering linkage member and the second portion of the vehicle changes. The steering assist member may comprise a first section configured and arranged to produce a pulling force along a longitudinal axis thereof; and a second section configured and arranged to produce a pushing force along a longitudinal axis thereof, wherein the first section and said second section are configured and arranged such that the longitudinal axis of the first section is aligned with the longitudinal axis of the second section.

Embodiments of the present invention also include a centering stabilizer comprising a first section configured and arranged to produce a pulling force along a longitudinal axis thereof and a second section configured and arranged to produce a pushing force along a longitudinal axis thereof, wherein the first section and the second section are configured and arranged such that the longitudinal axis of the first section is aligned with the longitudinal axis of the second section. There is a first mounting means attached to a first distal end of the centering stabilizer and a second mounting means attached to a second distal end of the centering stabilizer Preferably, the first section comprises a gas push-type spring and the said second section comprises a gas traction spring.

Additionally, the present invention relates to a trim lock comprising a first shaft extending in a first axial direction between a first end and a second end, wherein the first shaft includes a first aperture extending completely through the first shaft in the first axial direction; a second shaft extending in a second axial direction between a first end and a second end, wherein the second shaft includes a second aperture extending from the first end of the second shaft in the second axial direction; and an intermediate member rigidly secured to both the second end of the first shaft and the first end of the second shaft. The intermediate member includes a third aperture extending therethrough in a third axial direction, wherein the third axial direction, the second axial direction, and the first axial direction are all aligned with each other. There is at least one first port formed within a first section of the intermediate member, wherein the at least one first port is in fluid communication with the third aperture, and at least one second port formed within a second section of the intermediate member, wherein the at least one second port is in selective fluid communication with the third aperture.

Additionally, this embodiment also includes a spool valve piston seated within the first aperture, wherein the spool valve piston is configured and arranged for movement in the first axial direction with respect to the first shaft, wherein the spool valve piston includes a valve shaft and a land portion, and further wherein the land portion is of a larger diameter than the valve shaft. A push plug is seated within the second aperture, wherein one end of the push plug is configured and arranged to make contact with one end of the spool valve piston. A biasing member is seated within the second aperture, wherein the biasing member is configured and arranged to bias the spool valve piston. Also provided is a cover member that includes a first opening for slidably receiving the first shaft and a second opening for slidably receiving the second shaft.

In this embodiment, the intermediate member is configured and arranged to define a first fluid filled chamber and a second fluid filled chamber within the cover member. The intermediate member is slidably positioned between the first fluid filled chamber and the second fluid filled chamber such that when the intermediate member slides in one direction an axial length of the first fluid filled chamber increases and an axial length of the second fluid filled chamber decreases, and when the intermediate member slides in a direction opposite to the one direction, the axial length of the first fluid filled chamber decreases and the axial length of the second fluid filled chamber increases. The spool valve piston is configured and arranged to be moved between a closed position in which the land portion is aligned with the at least one second port and fluid communication between the first and second chambers is blocked, and an open position in which the land portion is out of alignment with the at least one second port, and fluid passes between the first and second chambers.

Embodiments of the present invention also include a centering assembly that is configured and arranged to provide a centering force between a first portion of a system and a second portion of the system, wherein the system is configured and arranged to be acted upon by a centering force. The centering assembly may include a centering stabilizer configured and arranged to provide a centering force along an axial direction thereof, where the centering stabilizer extends between a first axial end and a second axial end. In certain embodiments, the first axial end of the centering stabilizer is connected to the first portion of the system. The centering assembly also preferably includes a trim lock configured and arranged to change a location of the second axial end of the centering stabilizer, with respect to the second portion of the system, between an original location and an adjusted location, and to lock the second axial end of the centering stabilizer at the adjusted location. The trim lock preferably extends in an axial direction between a first axial end and a second axial end. A connecting unit is preferably provided for operatively connecting the trim lock with the centering stabilizer, wherein the connecting unit is rigidly connected to both the second axial end of the trim lock and the second axial end of the centering stabilizer in such a manner that the axial direction defined by the centering stabilizer and the axial direction defined by the trim lock are maintained in an essentially parallel relationship with each other. Finally, the assembly preferably includes a mounting member for movably mounting the centering stabilizer to the second portion of the system, wherein the mounting member is configured and arranged to permit axial movement of the centering stabilizer with respect to the second portion of the system.

BRIEF DESCRIPTION OF THE SEVERAL VIEWS OF THE DRAWINGS

Preferred embodiments of the present invention are described herein with reference to the drawings wherein:

FIG. 9 is an elevational view of a towed vehicle that includes the present steering assist member, shown being towed by a towing vehicle, via the use of a tow bar;

FIG. 10 is a schematic of the vehicles of FIG. 9, showing how the present steering assist member allows for a towing vehicle, with a towed vehicle attached thereto by a tow bar, to be backed-up, whereby the present steering assist member provides forces that maintain the steerable wheels in an aligned, centered position, thereby tracking along a pair of virtual parallel tracks;

DETAILED DESCRIPTION OF THE INVENTION

The present invention relates to various embodiments of a steering assist member for a vehicle, which can also be used as a steering stabilizer, as well as to the steering systems and vehicles that incorporate the present steering assist member or stabilizer.

Figure 1:
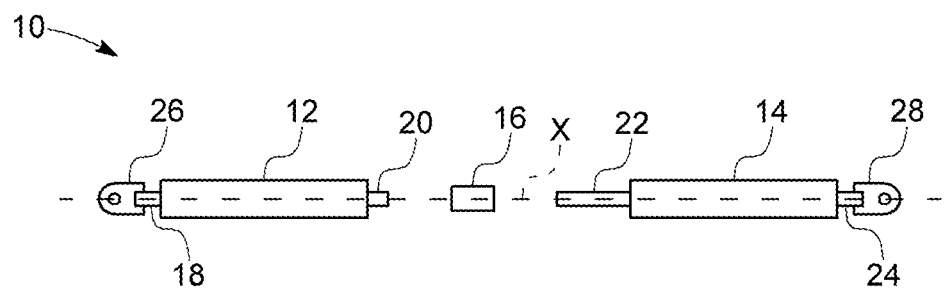
FIG. 1 is a schematic exploded view of a first embodiment of the present steering assist member.
Figure 2:
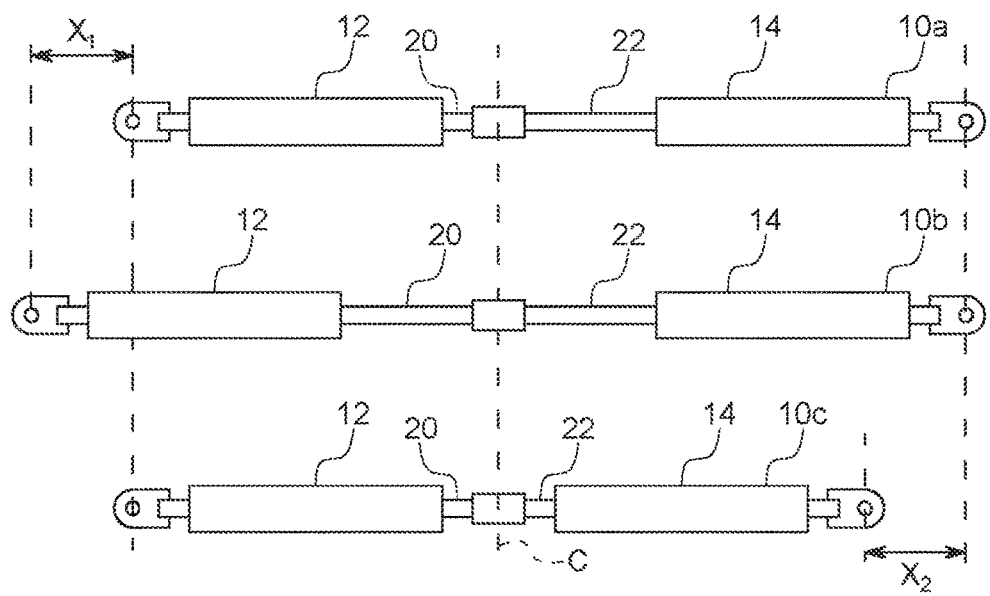
FIG. 2 is a schematic of the steering assist member of FIG. 1, shown under three different conditions (with the vehicle moving straight ahead; with the vehicle making a right turn; and with the vehicle making a left turn)

FIG. 1 is a schematic representation of the main components of an embodiment of the present steering assist member 10, shown in an exploded view, and FIG. 2 shows those same components of the steering assist member 10 in an assembled state, with no turning force thereon (top), a right turning force thereon (middle), and a left turning force thereon (bottom).

In particular, the steering assist member 10 of FIG. 1 includes a first section 12, a second section 14, and a connecting member 16 for connecting the first section 12 with the second section 14. Generally, the first section 12 provides a pulling force, and the second section 14 provides a pushing force, or vice versa (as the sections 12 and 14 may be switched, with section 12 providing the pushing force and section 14 providing the pulling force). More specifically, the first section 12 is configured and arranged to produce a pulling force along a longitudinal axis X thereof. The first section 12 extends between two longitudinal ends (18, 20) that are defined as a first proximal end 18 and a first distal end 20. The second section 14 is configured and arranged to produce a pushing force along the longitudinal axis X thereof. The second section 14 extends between two longitudinal ends (22 and 24) that are defined as a second proximal end 22 and a second distal end 24. The ends 18, 20, 22 and 24 may consist of rods, which can be threaded, or otherwise configured, to be connected to other components.

The proximal end 20 of the first section 12 and the proximal end 22 of the second section 14 may both be externally threaded so that they can be received within an internally threaded portion of the connecting member 16 (which may be, for example, a nut). Other means of connecting the first section 12 to the second section 14 are also contemplated as being within the scope of the invention, such as direct welding of the shafts together (with or without a supporting sleeve surrounding the welded joint), welding or otherwise fixing a sleeve around the adjacent ends of both shafts, having one shaft provided with a male threaded portion and the other shaft being provided with a female threaded portion, or even providing a unitary shaft that extends between the first and second sections. As can be seen in FIG. 1, the connecting member 16, or other connecting means, is configured and arranged to connect the proximal end 20 of the first section 12 to the proximal end 22 of the second section 14 such that the longitudinal axis of the first section 12 is aligned with the longitudinal axis of the second section 14 (i.e., both along the axis x).

The first and second sections (12, 14) may be formed of any types of mechanisms that are capable of providing the necessary pulling and pushing forces. For example, the first section 12 may consist of a gas push-type spring, and the second section 14 may consist of a gas traction spring (also referred to as a pull-type gas spring). Depending on the size of the vehicle, the gas springs could each be rated at between 20 and 500 pounds, or more. Alternatively, the first and second sections 12 and 14 may consist of coil springs, where the first section 12 consists of a compression coil spring, and the second section 14 consists of a tension coil spring. Each of the springs could be rated between about 20 and about 250 pounds per inch, or more. It is also contemplated that different types of mechanisms may be used for the first and second sections, such as providing a gas push-type spring for the first section and a tension spring for the second section, or by providing a compression coil spring for the first section and a gas traction spring for the second section.

Preferably, the first and second sections (12,14) are each configured and arranged to provide a pre-loaded force, such that the pulling force or the pushing force starts with any displacement from the "centered" position. Thus, with the present invention, which, in certain embodiments uses a combination of a first section 12 with a pulling force and a second section 14 with a pushing force, the force at zero displacement is at least two thirds (66.67%) of the full force, and/or the force at a slight displacement (i.e. about 2 mm) from "center" is also at least two thirds of the full force of the unit, which force increases with greater displacement until reaching the full return force of the unit. Accordingly, the present invention is providing a return-to-center force during normal driving (which could involve displacements of ¼ to ⅜ of an inch, or less) that is significant enough to actually return the wheels to their straight ahead forward driving position. For example, in a unit with a full force of 150 pounds, the initial and/or slight displacement force would be 100 pounds; in a unit with a full force of 300 pounds, the initial and/or slight displacement force would be 200 pounds; in a unit with a full force of 450 pounds, the initial and/or slight displacement force would be 300 pounds, etc.

One of the primary differences between mechanical springs and gas springs is the force provided at their free length. Gas springs always require some initial force to begin compression (or tension, depending on the type of spring), while mechanical springs have a characteristic known as free length. This is the length of the spring with no force applied. In coil springs, the force required to move the spring begins at zero and increases according to the spring rate. Gas springs in their "free length" require some initial force before any movement takes place. After the full initial force is applied, the gas spring will begin to compress (or expand, depending on the type of gas spring). This force can range from 20 to 450 pounds. In mechanical springs, this initial force is called pre-load and requires additional hardware to achieve. One example of a type of additional hardware to provide the pre-load is shown in the FIG. 6 embodiment, as described below.

Another significant difference between coil (mechanical) springs and gas springs is the spring rate. Gas springs can be designed with a very low spring rate utilizing a small package. A similar mechanical spring would require as much as twice the package space. The ability to have a controlled rate of extension is another major difference between the two types of springs (gas and coil). Gas springs can provide a rate of extension (controlled release of the stored energy) that can be set to a prescribed velocity. Mechanical springs do not have this ability. In fact, gas springs can have multiple extension rates within the same gas spring (typically two: one through the majority of the extension stroke, and another at the end of the extension stroke to provide dampening).

Returning to FIG. 1, this figure also shows that there is a mounting means 26, also referred to as a first mounting means, attached to the first distal end 18 of the first section 12, and a mounting means 28, also referred to as a second mounting means, attached to the second distal end 24 of the second section 14. In certain embodiments, the first and second mounting means (26 and 28) each consist of a metal bracket with an opening therein through which a bolt may be passed to affix the steering assist member 10 to other components. Although FIG. 1 shows the openings both facing the same direction, the openings may be oriented in a variety of different directions with respect to each other (such as having one opening rotated by 90° with respect to the other one), depending upon the desired mounting configurations for receiving each mounting means. Alternate configurations for the mounting means 26 and 28, such as any known means for rigidly fixing two components together, are also contemplated for this embodiment, and for the other embodiments described herein.

In certain embodiments, the first mounting means 26 is configured and arranged to securely attach the first section 12 of the steering assist member (centering stabilizer) 10 to a portion of a vehicle steering system (such as the tie rod, the center link or pitman arm) and the second mounting means 28 is configured and arranged to securely attach the second section 14 of the steering assist member (centering stabilizer) 10 to a frame of a vehicle (or other component that is affixed to the frame, and thus does not move relative to the frame), as described hereinbelow.

Figure 1A:
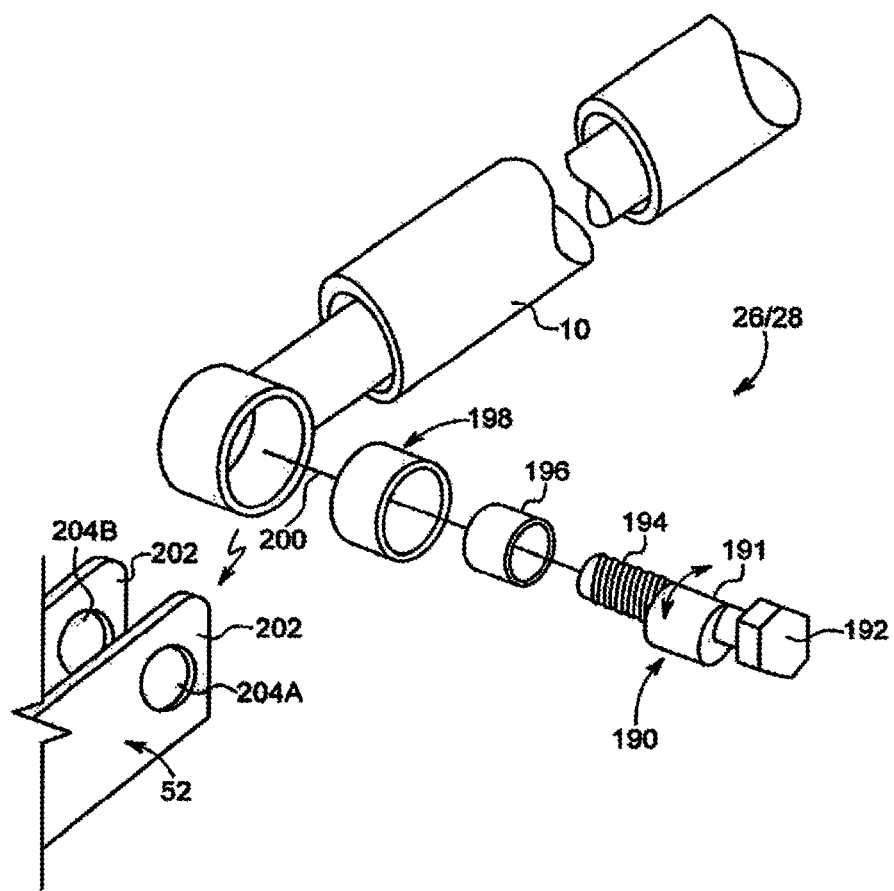
FIG. 1A is an exploded view of an example of a mounting means that is configured to allow for minor adjustments to the mounted length of the stabilizer to facilitate location the stabilizer in the proper centering position.

FIG. 1A is an example of a mounting means 26/28 (i.e., it may be used as either the first mounting means 26 or the second mounting means 28) that is configured for mounting the steering assist member (centering stabilizer) 10 to the frame 52 of a vehicle (or a connector rigidly secured to the frame), and which provides for small adjustments (such as about ⅛ inch in either direction) in the mounted location of the stabilizer to change the mounted length of the stabilizer. The mounting means 26/28 of FIG. 1A includes an eccentric bolt 190 (also known as a castor adjustment bolt) provided with an eccentric shaft portion 191 thereon whose center is offset from the center of the head 192. The threaded end 194 of the eccentric bolt 190 is configured to be inserted into a bushing 196 that is preferably made of steel or other rigid metal. The bushing 196 is configured to be inserted into a sleeve 198 that is preferably made of neoprene or other rigid plastic, which sleeve is configured and arranged to be inserted within a socket 200 attached to one end of the stabilizer 10.

During mounting, the sleeve 198 and the bushing 196 are inserted into the socket 200, and these components are inserted between legs 202 of the frame 52. The eccentric bolt is then inserted through first aperture 204A of the frame, and then into the bushing 196 (which bushing is within both the sleeve 198 and the socket 200), and then through the second aperture 204B of the frame, such that the eccentric shaft portion 191 is seated within the bushing 196, where the bolt can be tightened by a having the threaded portion 194 mate with a complementary interior threaded portion of a nut (not shown). To adjust the mounted length of the stabilizer 10, the bolt is loosened, and rotated by 90° or less until the desired location is reached due to the eccentric shaft portion 191. The bolt is then re-tightened to lock the stabilizer at the new location. Such a configuration makes it easier to make slight adjustments, without needing to release the other end of the stabilizer from the tie rod (or other location).

FIG. 2 is a schematic representation of the steering assist member 10 of FIG. 1 shown under three different conditions (labelled as steering assist members 10a, 10b and 10c), as if installed in a vehicle, where the top portion of the figure represents the condition of steering assist member 10a when the vehicle is going straight; the middle portion of the figure represents the condition of the steering assist member 10b when the vehicle is making a right turn; and the lower portion of the figure represents the condition of the steering assist member 10c when the vehicle is making a left turn.

Specifically, steering assist member 10a, which represents the situation when the vehicle is going straight, shows how the first section 12 is relaxed (i.e., under no outside pressure) and how the second section 14 is also relaxed (i.e., under no outside pressure).

Steering assist member 10b, which represents the situation when the vehicle is making a right turn, shows how the first section 12 is pulled out to the left, with the rod at end 20 being pulled outwardly of the cylinder, but how second section 14 is relaxed (i.e., under no outside pressure). Comparing steering assist member 10a with steering assist member 10b shows that the left-hand side of the member 10b is pulled toward the left by the distance X1, while the right-hand side of member 10b is aligned with the right-hand side of member 10a.

Finally, steering assist member 10c, which represents the situation when the vehicle is making a left turn, shows how the first section 12 is relaxed (i.e., under no outside pressure), while the second section 14 is compressed to the left, with the visible portion of the rod 22 being shortened because it has slid into the cylinder. Comparing steering assist member 10a (and member 10b) with steering assist member 10c shows that the right-hand side of the member 10*b* is pushed toward the left by the distance X2, while the left-hand side of member 10*c* is aligned with the left-hand side of member 10*a*. Thus, it can be seen that any move off-center either pulls traction on one section (such as on a right turn) or compresses the other section (such as on a left turn).

Figure 3:
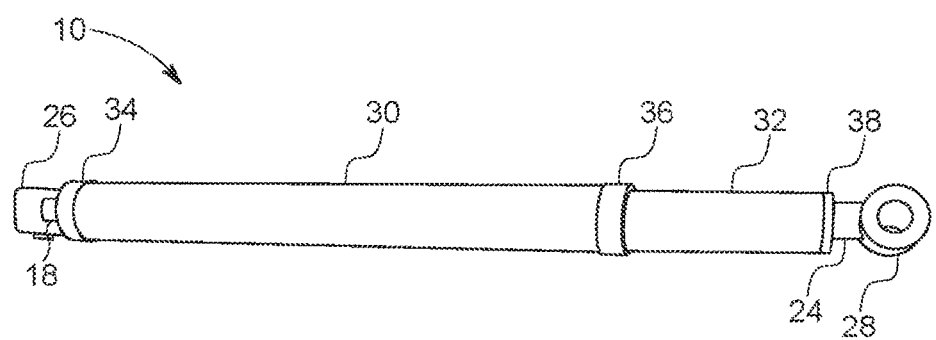
FIG. 3 is an embodiment of the present steering assist member including a protective covering.

FIG. 3 shows an embodiment of the steering assist member 10 that includes a protective covering. In this embodiment, the protective covering consists of a covering member 30 (which covers the second section 14 (the pushing member), shown in FIG. 1) and a covering member 32 (which covers the first section 12 (the pulling member), shown in FIG. 1), wherein the first covering member 30 is of a larger diameter than that of the second covering member 32, thereby allowing the second covering member to slide within the first covering member. To prevent debris from entering into the covering members, end seals (with appropriate center apertures for the rods) may be provided such as end seals 34, 36 and 38. The covering members 30 and 32 and the end seals 34, 36 and 38 are preferably made of metal to withstand the environment found below a vehicle. Additional sealing members may be provided around the rods, if desired. Optionally, the area around end seal 36 may be provided with a generally cylindrical flexible bellows seal (not shown) that surrounds end seal 36, if desired.

Figure 4:
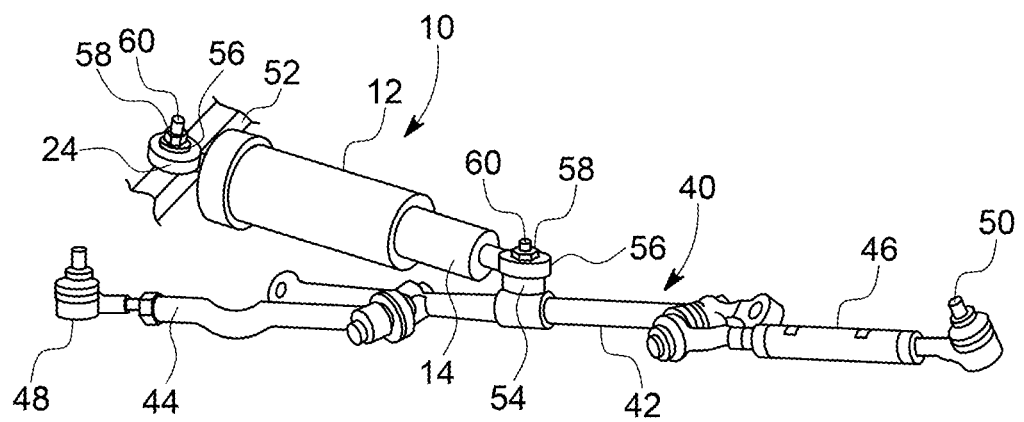
FIG. 4 shows one example of how the present steering assist member can be incorporated into a steering linkage.

FIG. 4 shows one example of how the steering assist member 10 can be incorporated into a steering linkage. In FIG. 4, the steering assist member 10 is mounted on a vehicle steering system 40 including a center link 42 (or center tie rod) and outer tie rods 44 and 46. When the steering wheel of the vehicle is turned, the center link 42 is moved transversely to move the outer tie rods 44 and 46 to thereby turn the wheels of the vehicle with respect to the frame, which wheels (or more specifically, wheel hubs (such as left hub 80 of FIG. 5, where right hub is not shown, that are configured and arranged to be turned with respect to the vehicle frame 20) are attached to tie rod ends 48, 50 (such as via a pair of steering knuckles, such as left and right knuckles 82 shown in FIG. 5). The steering assist member 10 of the present invention is connected between the center steering link 42 and an element 52 of the vehicle frame. The steering assist member 10 includes first and second sections 12 and 14 each supporting a mounting means in the form of an attachment collar 54 held in place on the vehicle by a washer 56 and nut 58 engaging a mounting stud 60. The steering assist member 10 continuously urges the steering linkage toward a normal or centered position in which the vehicle wheels are in their straight-ahead position.

Figure 5:
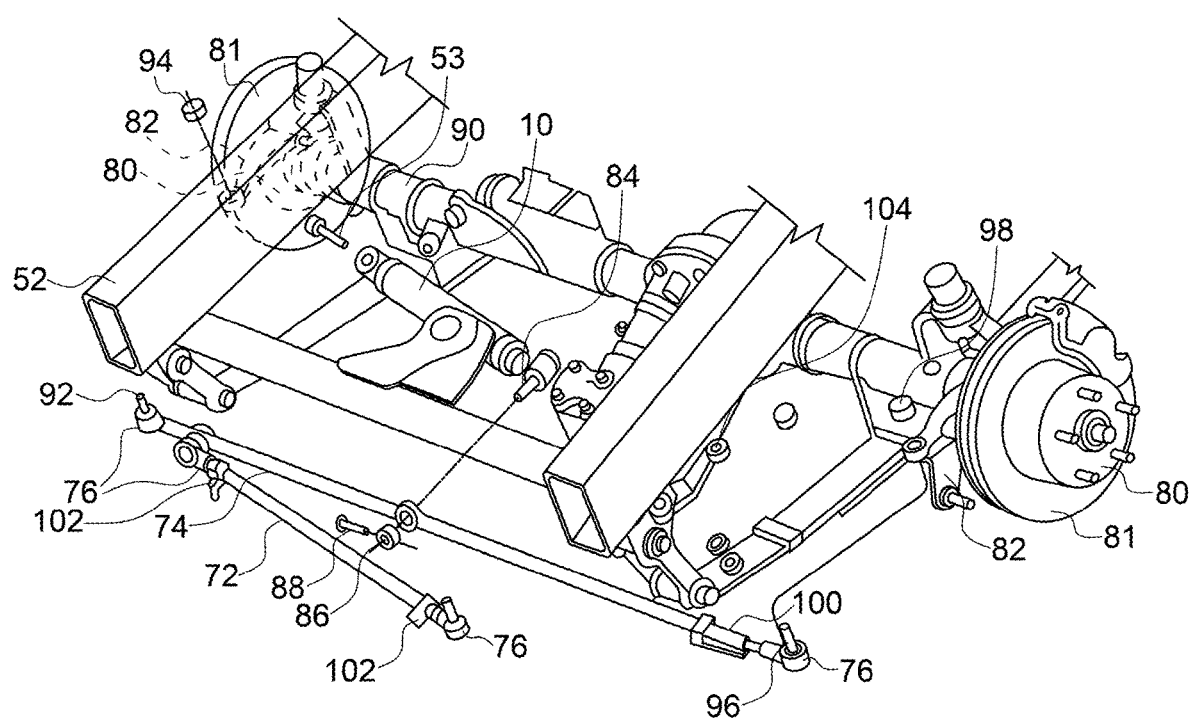
FIG. 5 shows another example of how the present steering assist member can be incorporated into a steering linkage.

FIG. 5 shows another example of how the steering assist member 10 can be incorporated into a different version of a steering linkage. In FIG. 5, the steering assist member 10 is mounted on a vehicle steering system 70 that includes a drag link 72, a tie rod 74, and four tie rod ends 76. As can be seen in FIG. 5, this configuration includes vehicle frame element 52 and a pair of wheel hubs 80 configured and arranged to be turned with respect to the vehicle frame 52, wherein the pair of wheel hubs are defined as a left wheel hub 80 and a right wheel hub 80, and brake discs 81 associated with the wheel hubs. There is a right steering knuckle 82 operatively connected to the right wheel hub 80, wherein the right wheel hub is configured and arranged to rotate with respect to the right steering knuckle. Similarly, there is a left steering knuckle 82 operatively connected to the left wheel hub 80, wherein the left wheel hub is configured and arranged to rotate with respect to the left steering knuckle.

This configuration of FIG. 5 also includes tie rod 74 that is operatively connected to the right and left steering knuckles 82 via a pair of tie rod ends 76. In this embodiment, the steering assist member 10 has a first end connected to the vehicle frame 52 (via a connection method means that may include bolt 53, or other connection assembly) and a second end that is securely connected to the tie rod 74, such as via a stud 84, a nut 86, and a cotter pin 88 (although other attachment methods are contemplated). Alternatively, the first end of the steering assist member 10 may be connected to a portion of one of the steering knuckles 82, or to the axle housing 90, instead of being attached directly to the vehicle frame 52.

Specifically, the right end of the tie rod 74 is connected to the right steering knuckle 82 via the tie rod 76 (or a ball stud, or other desired connection method) by connecting stud 92 through a hole on the right steering knuckle 82 and affixing a nut 94 thereto. The left end of the tie rod 74 is connected to the left steering knuckle 82 via the tie rod end 76 with the aid of stud 96 and nut 98 (or other desired connection method). The tie rod end 76 is preferably connected to the tie rod 74 via an adjustment sleeve 100.

Finally, the drag link 72 includes a tie rod end 76 one each end thereof, connected to the drag link via clamps 102. As can be seen in FIG. 5, one end of the drag link 72 is connected to the tie rod 74, and the other end is connected to a pitman arm 104, which translates the angular motion from the steering box (not shown) into linear motion.

The steering assist member 10 of FIG. 5 (or of FIG. 4) may consist of any of the members 10 described herein. Further, the steering assist member 10 of FIG. 5 (or FIG. 4) may consist of a single self-contained unit of a mechanically powered strut of the self-centering type, which provides loading to return to a neutral position from both directions, or it may consist of a self-centering damper with a single pressurized gas chamber with a piston assembly therein. In addition to the embodiments of the steering assist member described herein, embodiments are also contemplated in which the longitudinal axis of the first section is aligned with that of the second section such that they are parallel to each other, as opposed to being co-linear as shown and described with regard to the exemplary embodiments herein. However, whatever type of steering assist member is utilized, it must be able to provide the necessary return-to-center force at zero displacement (or very small displacement, such as 2 mm), which is estimated to be at least 40-50 pounds, or more, for certain applications, and at least 70-100 pounds for other applications (such as the reverse motion of a dinghy described below). Alternatively, the steering assist member should be rated with a predetermined maximum return-to-center force, and it should be designed to operate such that at least two thirds of the predetermined maximum return-to-center force is applied when the steering assist member is displaced along its central axis by 2 mm.

Figure 6:
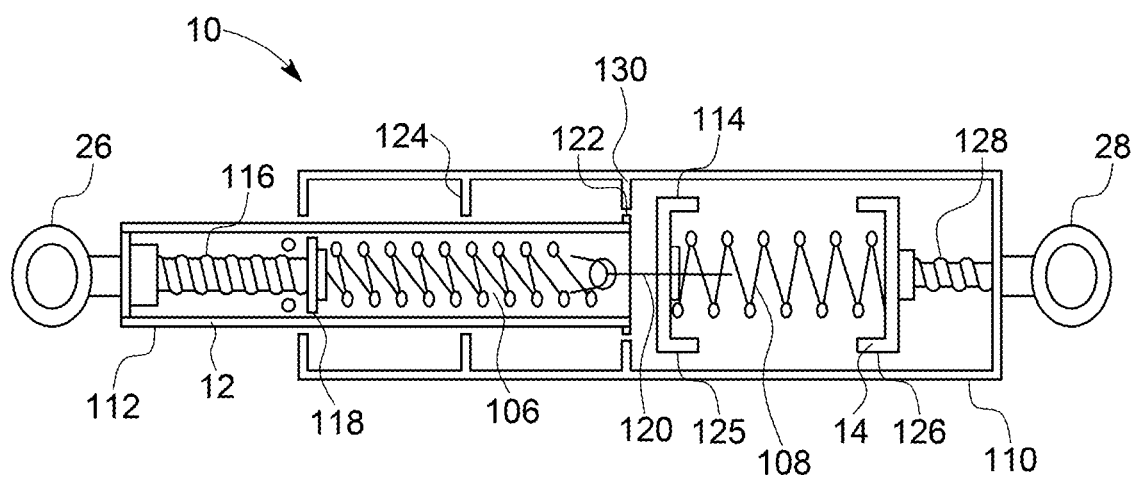
FIG. 6 is a schematic of a second embodiment of the present steering assist member.

FIG. 6 shows another embodiment of the present steering assist member 10. This embodiment is based on the use of a compression coil spring in combination with a tension coil spring. Generally, the FIG. 6 embodiment includes a first section 12 that is configured and arranged to produce a pulling force along a longitudinal axis thereof via the use of a tension coil spring 106; a second section 14 configured and arranged to produce a pushing force along a longitudinal axis thereof via the use of a compression coil spring 108; an outer casing 110, which is preferably cylindrical; and first and second mounting means 26 and 28. Of course, the springs within the first and second sections can be reversed such that the first section includes the tension spring and the second section includes the compression spring.

More specifically, the FIG. 6 embodiment includes a first section casing 112, which is preferably cylindrical, and which surrounds the tension coil spring 106. A section of ACME threads 116 are attached to one end of the first section casing 112, and the tension coil spring 106 is operatively mounted to the threads 116 on one side thereof. In particular, one end of spring 106 is connected to a rider member 118, which includes an internally threaded aperture, which allows for adjusting the force of spring 106 by moving rider member 118 in one direction or the other along threads 116. The other end of the tension coil spring 106 is secured to a connecting member 120, which connects the first section 12 to the second section 14. The end of the first section casing 112 nearest to the connecting member 120 includes a flange 122 (which may be annular or divided) on an outer periphery thereof that is configured and arranged to make contact with a stop member 124 (which may be annular or divided) on an inner periphery of the outer casing 110 to prevent the first section assign 112 from sliding out of the outer casing 110. It should be noted that both flange 122 and first stop 124 can be annular members, but if one of flange 122 or first stop 124 is not annular (and is thus divided), it is preferable that the other member be an annular member to ensure contact between the flange and the stop in situations where there has been relative rotation between the first section casing 112 and the outer casing 110.

The FIG. 6 embodiment also includes a second section casing 114, which preferably consists of two sections, 125, 126. The compression coil spring 108 is provided within the second section casing 114, with one end of the spring 108 attached to the end of the section 125 of the casing 114 that is connected to the connecting member 120, and with the other end of the spring 108 attached to the other section 126 of the casing 114. Section 126 of the casing 114 preferably includes a threaded aperture for affixing this member to the ACME threads 128. Such a configuration allows for adjusting the force of spring 108. The interior of the outer casing 110 preferably includes a second stop 130, which is preferably annular, but need not be, and which is configured to prevent the second section casing 114 from moving too far to the left.

Although the FIG. 6 embodiment uses coil springs instead of gas springs, as in some of the other embodiments, the principles of operation and benefits of this embodiment are generally the same as the other embodiments. Each of the springs could be rated between about 20 and about 250 pounds per inch, or more.

Figure 7:
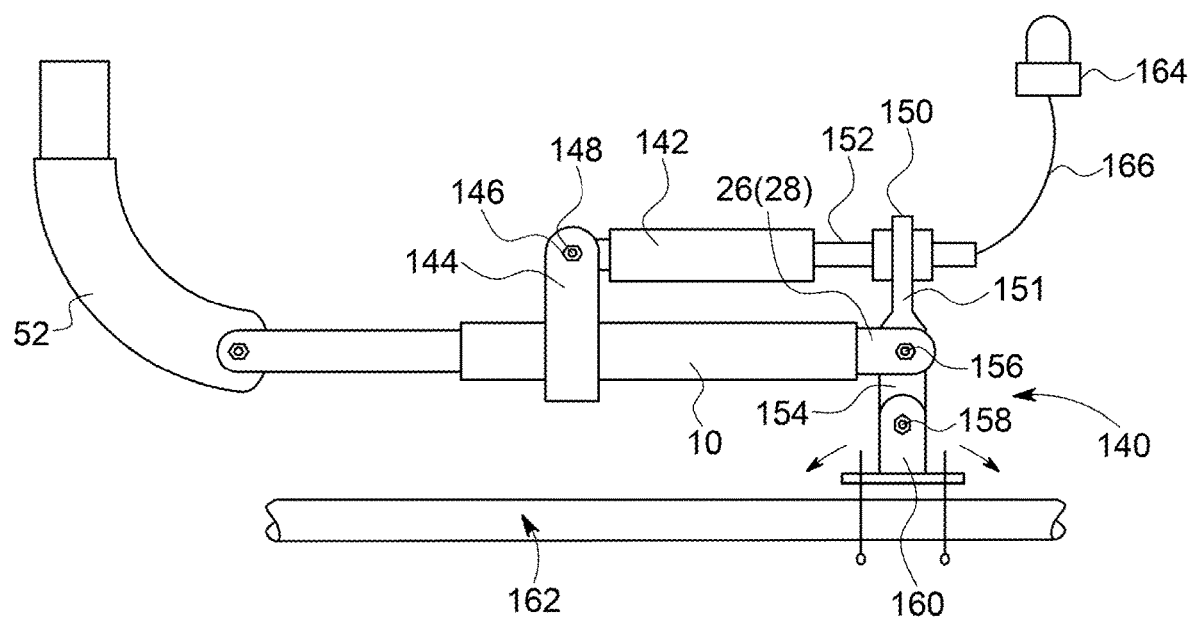
FIG. 7 is a schematic of an embodiment in which the present steering assist member is incorporated into a dynamically adjustable mount.
Figure 8A:
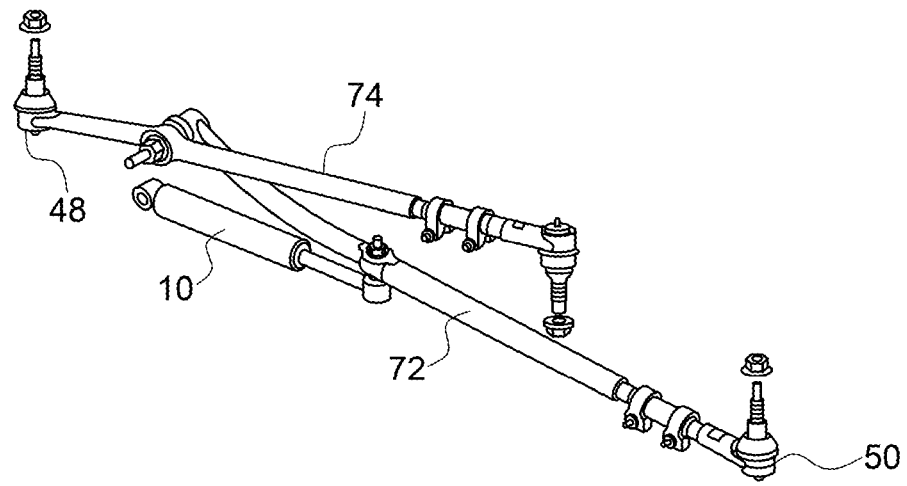
FIGS. 8(A)-8(E) show various additional examples of how the present steering assist member can be incorporated into different versions of steering linkages.
Figure 8B:
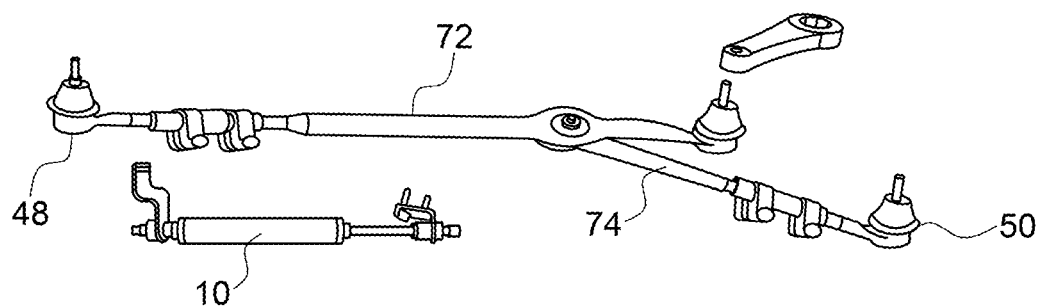
Figure 8C:
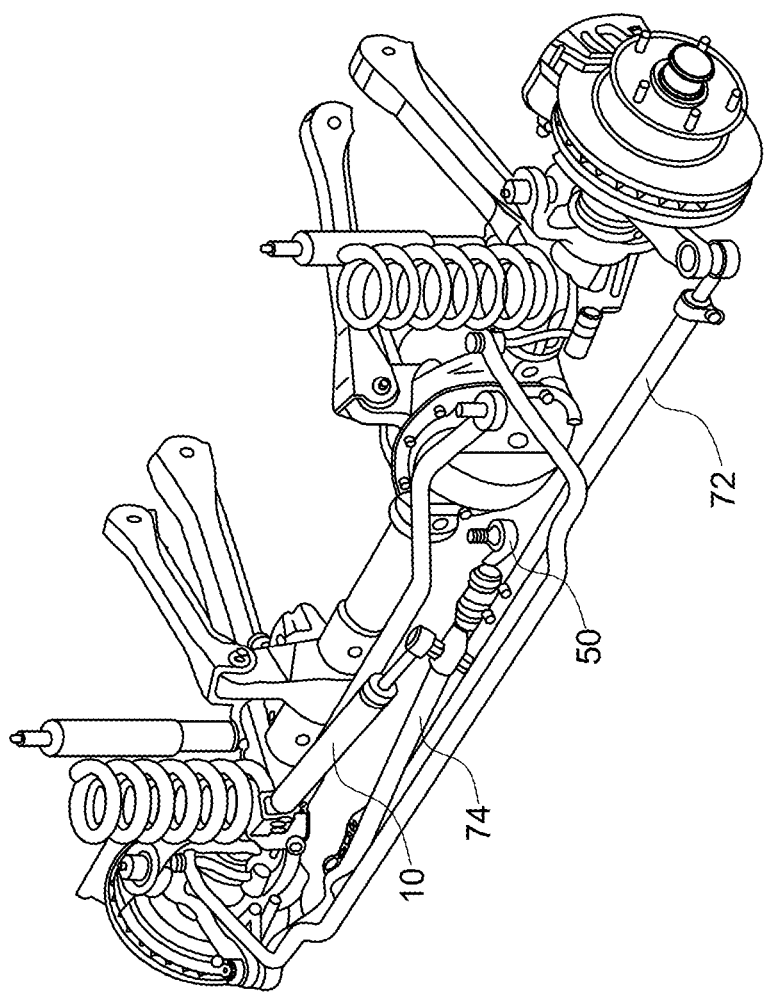
Figure 8D:
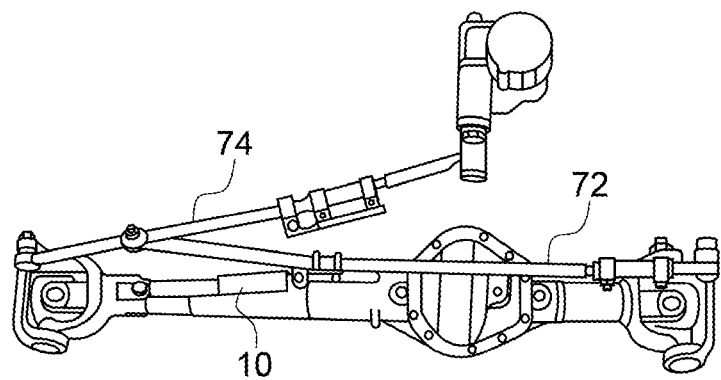
Figure 8E:
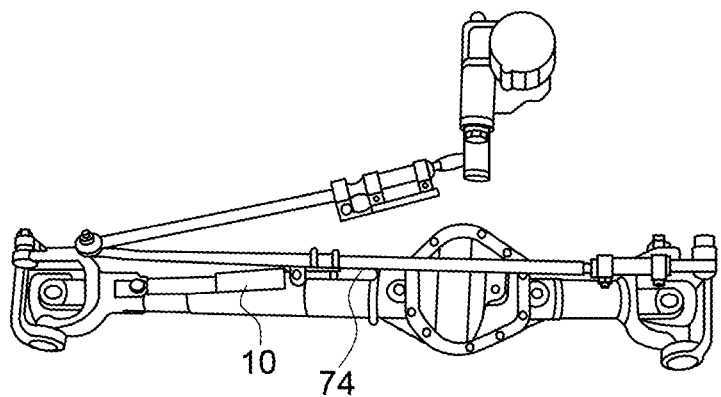

FIG. 7 shows a schematic of an embodiment in which the present steering assist member 10 is included in a dynamically adjustable mount 140, which allows for the adjustment of the "centered" position provided by the steering assist member 10 from within the passenger compartment/cab of the vehicle. For example, when a steering assist member is installed within the steering system of a vehicle, the apparent "centered" position could be when the vehicle's front wheels are aligned so that the vehicle will move forward in a straight line. However, either due to changing conditions (such as shifting vehicle load, unevenly inflated tires, severe cross winds, etc.) or due to an original error in the positioning of the steering assist member resulting in a slight displacement from providing a true "centering" force, the arrangement of the steering assist member may need to be dynamically adjusted so that it provides a true "centering" force. The FIG. 7 embodiment of a mount for the steering assist member shows one example of a system which provides for dynamically adjusting the "centered" position from within the vehicle, either after installation to correct for offset installation or at any time thereafter due to a change in conditions (including while driving the vehicle). It should be noted that any of the embodiments of the steering assist member 10 described herein can be used with the dynamically adjustable steering mount 140, and that it is also contemplated that other types of steering assist members or stabilizers could also be used with mount 140.

In this embodiment of FIG. 7, one end of a locking adjustable gas spring 142 is securely mounted to steering assist member 10, such as via first clamp member 144, which includes an opening 146 for receiving a pin member 148 secured to one end of the locking adjustable gas spring 142. The other end of the locking adjustable gas spring 142 is rigidly secured to a second clamp member 150, with an opening of the second clamp member 150 surrounding and securely clamping the movable shaft 152 to prevent relative movement between the shaft 152 and the second clamp member 150. The base 151 of the clamp 150 is either integrally formed with or securely attached to a bar member 154, which includes first and second pins 156, 158 that extend generally parallel to each other and generally perpendicularly with respect to the longitudinal axis of the bar member 154. The first pin 156 is rotatably received within an aperture formed in the mounting means 26 (or 28) of the assist member 10 (thereby defining a first pivot assembly), and the second pin 158 is rotatably received within an aperture formed in clamping member 160 (thereby defining a second pivot assembly), which in this embodiment is securely fixed to a portion of the tie rod 162 that is associated with the steering system of a vehicle, as schematically shown in FIG. 7. This arrangement between the aperture of the clamping member 160 and the pin 158 of the bar member 154 allows for the bar member 154 to pivot about pin 158, as represented by the arrows, as described more fully below. The opposite end of the assist member 10 is attached, directly or indirectly, to the vehicle frame element 52 in any desired method, such as with a pin/aperture configuration.

In operation, the vehicle operator pushes a push button release 164, which is located within the passenger compartment/cab of the vehicle and is connected to the locking adjustable gas spring 142 by a Bowden cable 166 (via a release head, not shown), to unlock the locking adjustable gas spring 142, and the vehicle operator then turns the steering wheel to arrive at the desired centered position, while keeping the button 164 engaged. Once the desired centered position is located, the vehicle operator releases the button 164, and the locking adjustable gas spring 142 is locked in that position. Since the shaft 152 is rigidly connected to the clamp member 150, which is in turn rigidly connected to the bar member 154, axial movement of the shaft 152 results in the bar member 154 pivoting about the pin 158. Such movement effectively changes the resulting "centering" force upon the tie rod 162 in one direction or the other to compensate for an original mis-alignment or a changed condition. The locking adjustable gas spring 142 is preferably of the type configured for rigid locking in both the pull and push-in directions, or rigid locking in the pull direction and at least relatively rigid locking in the push-in direction. Structurally, locking adjustable gas spring 142 could be of the type that includes an oil chamber that is separated from a gas chamber by a floating piston, whereby if a force is applied on the locked spring in the extension direction, the locking force is relatively rigid up to the mechanical strength of the spring, and if a force is applied in the compression direction, the spring remains rigid until the force of the pressure on the floating piston is exceeded. Suitable locking adjustable springs are commercially available from a variety of manufacturers, including Bansbach (such as the easylift line) and Stabilus GmbH (such as the Block-o-Lift line). Such locking adjustable springs are available with forces of between 50 and 1300 Newtons, and with a stroke length of between 10 and 500 mm One specific example of a locking adjustable gas spring that has been used in the present invention is one that is valued at 100 pounds of push force, which will provide 360 pounds of locking force in compression.

FIGS. 8A-8E show various examples of the types of steering assemblies that the present steering assist member 10 can be incorporated into in order to provide steering assistance and/or centering. It should be noted that any of the embodiments of the steering assist member 10 described herein can be provided into the steering systems of FIGS. 8A-8E. Further, it should also be noted that the dynamically adjustable mount 140 of FIG. 7 could also be provided as a mounting means to mount the steering assist member 10 included in any of the steering systems of FIGS. 8A-8E. In FIGS. 8A-8E, the same reference numbers provided earlier are used for same components of the earlier figures, and thus a detailed description will not be provided herein.

One of the many benefits of the present centering stabilizer/steering assist member is that if the centering stabilizer/steering assist member is installed on a vehicle that is being towed by another vehicle using a tow bar (i.e., with all four wheels of the towed vehicle on the ground), the centering stabilizer/steering assist member maintains the steerable wheels of the towed vehicle (also referred to as a dinghy) in the straight ahead position, with only slight movement, when the operator of the towing vehicle drives the towing vehicle in reverse with the towed vehicle attached thereto (during forward motion of the vehicles, the steerable wheels of the dinghy turn essentially normally). Without the inclusion of the present centering stabilizer/steering assist member in the towed vehicle, the steerable wheels of the towed vehicle tend to be forced into full turn left position or full turn right position when the towing vehicle backs up, and further reverse movement under such a condition can damage the tow bar and/or the towed vehicle and/or the towing vehicle.

Turning now to FIGS. 9 and 10, an explanation is provided of such a benefit of providing the ability to back up a towing vehicle with a towed vehicle attached thereto by a tow bar (i.e., without the use of a trailer that lifts all four wheels of the dinghy off the ground or a tow dolly that lifts the two steerable wheels of the dinghy off the ground) by installing any of the disclosed embodiments of the centering stabilizer/steering assist member 10 into the towed vehicle in the manner described herein. FIG. 9 is an elevational view of a towing vehicle 170 (such as an RV (as shown), or a truck, an SUV, an automobile, or other vehicle capable of towing another vehicle) that is attached to a towed vehicle 172 (such as an automobile, truck, SUV, etc.) by a tow bar 174 (which may be of any desired configuration, such as the Y-configuration shown, or may be of triangular configuration, or simply a straight bar, or other configuration, depending on the user's requirements). As mentioned above, the towed vehicle 172 includes any of the embodiments of the present centering stabilizer/steering assist member 10 installed therein. As can be seen in FIG. 9, the use of the tow bar 174 (as opposed to a tow dolly or trailer) results in all four wheels, including the two steerable wheels, of the towed vehicle 172 being in contact with the ground G. Moving of the towing vehicle 170 in the reverse direction (as shown by the arrow) results in the tow bar 174 pushing the towed vehicle 174 in the reverse direction, and, likewise, moving the towing vehicle in the forward direction results in the tow bar pulling the towed vehicle 172 in the forward direction.

As mentioned above, in a towed vehicle 172 that lacks the present centering stabilizer/steering assist member 10, attempting to back-up the towing vehicle 170 with the towed vehicle 172 attached thereto in the manner shown could result in damage because the rearward force on the steerable wheels of the towed vehicle 172 will cause them to be turned in one direction or the other, thereby hindering further rearward movement, and most likely resulting in damage to the tow bar and either (or both) of the vehicles.

In contrast, when an embodiment of the present centering stabilizer/steering assist member 10 is installed in the towed vehicle 172, the member 10 provides the necessary centering forces to maintain the steerable wheels (i.e., the front wheels) of the towed vehicle 172 in a generally aligned position (with only slight movement to one side or the other), such as represented by the two generally parallel arrows in the schematic drawing of FIG. 10. Accordingly, the towing vehicle, with the towed vehicle attached thereto as shown, can be backed-up easily, and without causing damage to the tow bar or either of the vehicles.

Briefly, the steps involved in such a process include: providing a first vehicle (i.e., a towing vehicle); providing a second vehicle (i.e., a towed vehicle) that includes a pair of steerable wheels with a centering stabilizer/steering assist member installed in association with the steering linkage of the pair of steerable wheels and another pair of wheels; attaching the second vehicle to the first vehicle via a tow bar, such that the pair of steerable wheels and the other pair of wheels are in contact with the ground; and moving the first vehicle in a reverse direction, which causes the second vehicle to also move in a reverse direction, and whereby the centering stabilizer/steering assist member causes the steerable wheels to remain in a generally aligned position due to the return-to-center forces provided by the centering stabilizer/steering assist member, thereby enabling reverse direction movement of the first and second vehicles without damaging the tow bar or either of the vehicles.

Figure 11:
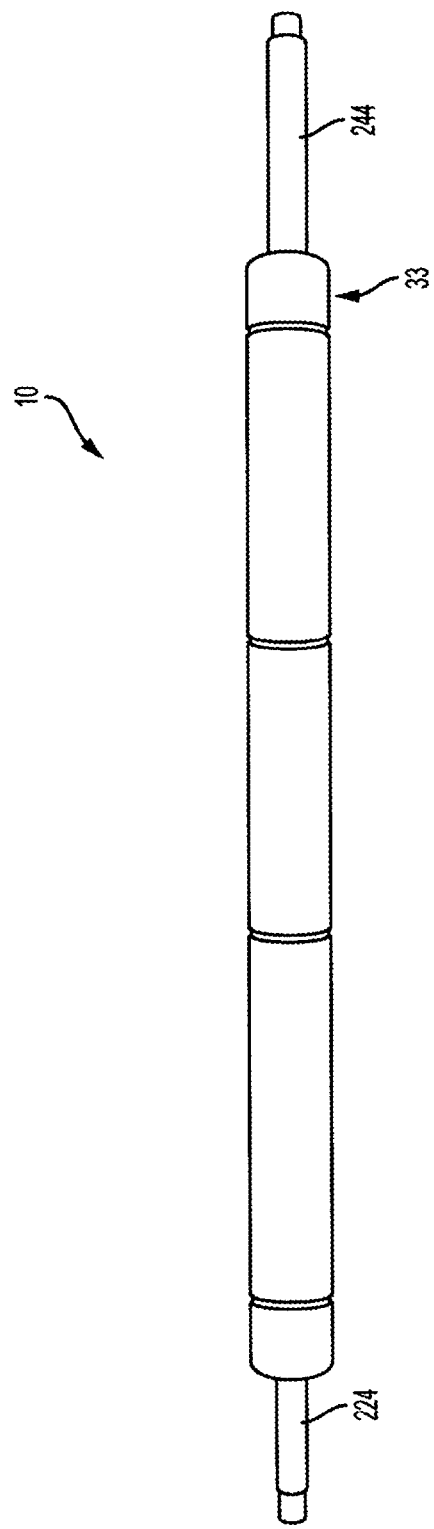
FIG. 11 is a drawing of another embodiment of the present steering assist member in which the first and second sections are enclosed within a single housing (or cover)
Figure 12:
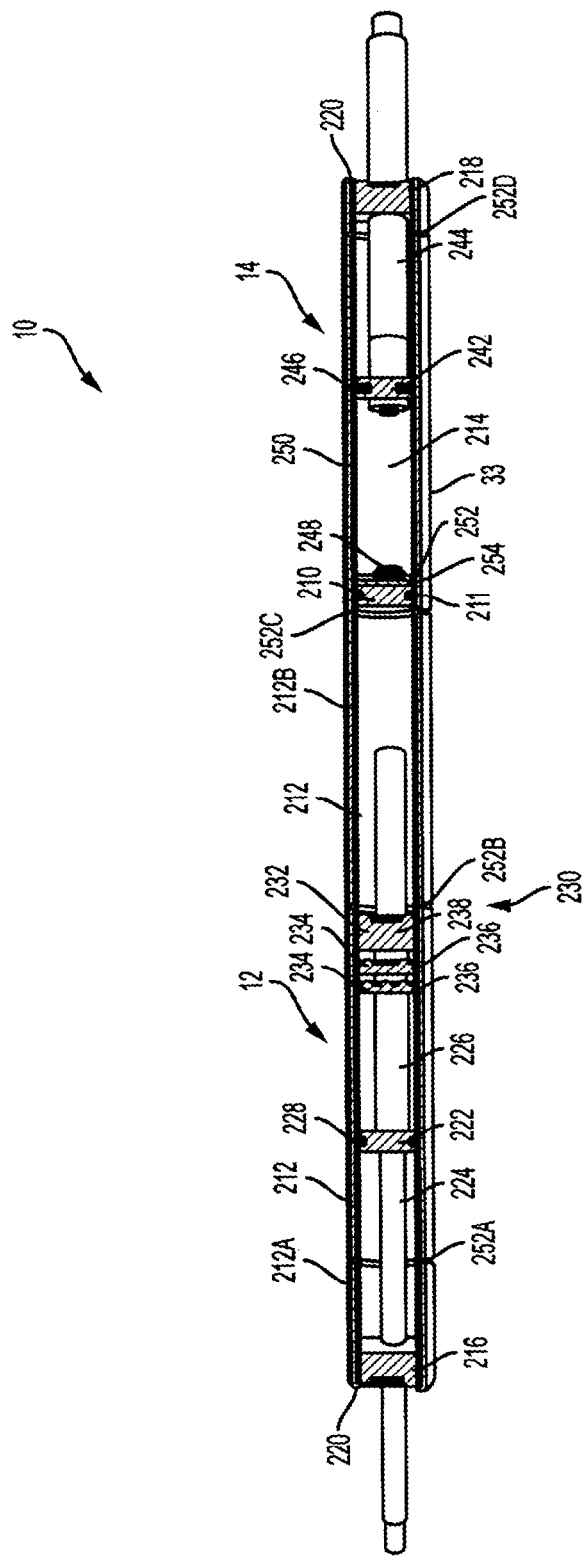
FIG. 12 is a cutaway view of the steering assist member of FIG. 11.

Turning now to FIGS. 11 and 12, another embodiment of the present centering stabilizer/steering assist member is shown and will be discussed. In particular, FIG. 11 is a top view of this embodiment of the centering stabilizer/steering assist member 10, and FIG. 12 is a cut-away view of the same member 10.

As can be seen in FIGS. 11 and 12, this embodiment of the centering stabilizer/steering assist member 10 includes a single cover (or housing member) 33 that contains both the first section 12 and the second section 14. In this embodiment, the first section 12 is a gas traction spring (i.e., a gas pull-type spring) and the section 14 is a gas push-type spring (but of course these two components could be reversed). The first and second sections 12,14 are separated from each other by a dividing member 210 which is rigidly affixed to the interior of the housing member 33, and which provides a gas and fluid tight seal between the first and second sections 12,14, such as via the use of an elastomeric o-ring 211 positioned within a annular recess in the outer periphery of the dividing member 210. The dividing member 210 divides the housing 33 into a first chamber 212 (associated with the first section 12) and a second chamber 214 (associated with the second section 14), and, as discussed below, the first chamber is further divided into two sections 212A and 212B. The first portion 212A of the first chamber 212 and the second chamber 214 are filled with a pressurized gas, such as nitrogen or other suitable gas, that is pressurized to an appropriate range for the intended use. The second portion 212B of the first chamber —212 is not under pressure (i.e., at atmospheric pressure, or under significantly less pressure than portion 212A), and is preferably filled with air or other suitable gas. While the chambers 212A and 214 can be pressurized to the same level, it is also contemplated that the chambers 212A and 214 could be pressurized to different levels. In addition, the chambers 212A, 214 each preferably include a small amount of oil, or other lubricant, to facilitate the axial movement of the pistons within the chambers and the piston rods within the apertures in the various rod guide members discussed below.

The distal ends of the housing 33 are provide with end caps 216, 218 that seal the ends of the housing and also act as guides for the associated piston rods via a guide aperture provided therein. The end caps 216, 218 may each comprise a single member, or each end cap may consist of an assembly that includes multiple components, such as a generally cylindrical metal rod guide member, a washer member, and a disk-like elastomeric seal member, which are stacked on each other in the axial direction, and each of which include an aperture therein for slidably receiving the piston rod. The distal ends of the housing may each include an annular lip portion 220 for maintaining the end caps 216, 218 within the housing 33. In addition to, or as an alternative to, the lip portions, the end caps 216, 218 may be secured within the housing in any desired manner, such as via welding, adhesive, press-fit, etc.

The first section 12, which in this embodiment is a traction type gas spring, includes a piston 222 that separates a piston rod into two sections, a first, smaller diameter portion 224, and a second, larger diameter portion 226. The piston 222, which is rigidly affixed to the rod 224/226, includes one or more small apertures to allow the gas within the chamber 212 to flow, in a restricted manner, from one side of the piston 222 to the other side of the piston as the rod 224/226 is moved in the axial direction. Preferably, the piston 222 includes an elastomeric o-ring 228 seated within a recess on the outer circumference of the piston 222.

The first section 12 also includes an interior rod guide assembly 230 that is configured and arranged to guide the larger diameter rod portion 226, and to seal between the two portions of the chamber 212, which are designated as chamber portions 212A and 212B. For example, in certain embodiments, the interior rod guide assembly 230 may include a generally cylindrical metal rod guide member, one or more washer members, and one or more disk-like elastomeric seal members. In the embodiment shown in FIG. 12, the interior rod guide assembly 230 includes a generally cylindrical metal rod guide member 232, a pair of washer members 234, and a pair of disk-like elastomeric seal member 236, with one seal member 236 being associated with each washer member 234. Each of the components of the interior rod guide assembly includes an aperture for slidably receiving the rod 226 therein. Further, in this embodiment, the washer members 234 each include an annular ridge 238 on one side thereof, which ridges are each configured to be received within a corresponding annular recess formed in the associated seal member 236. Although not shown, in other embodiments, the seal members may lack the annular recess. Further, the washer members may lack the annular ridge.

The second section 14, which in this embodiment is a push-type gas spring, includes a piston 242 that is formed on the interior end of a piston rod 244. The piston 242, which is rigidly affixed to the rod 244, includes one or more small apertures to allow the gas within the chamber 214 to flow, in a restricted manner, from one side of the piston 242 to the other side as the rod 244 is moved in the axial direction. Preferably, the piston 242 includes an elastomeric o-ring 246 seated within a recess on the outer circumference of the piston 242. The dividing member 210 also acts as end stop for stopping further leftward axial travel of the piston 242. As an enhancement of this stopping feature, a disk 248 made of metal or other rigid material may be provided on the contact surface of the dividing member 210. The disk 248 may be inset into an elastomeric member 252 that is attached to a flat washer 254 that abuts against the dividing member 210.

As can be seen in FIG. 12, the housing member 33 is provided with a plurality of inwardly facing annular protrusions 252A, 252B, 252C and 252D. Annular protrusion 252A acts as a stop to prevent the piston 222 of the first section 12 from moving to far in the leftward direction, and annular protrusion 252D acts as a stop to prevent the piston 242 of the second section 14 from moving too far in the rightward direction. Additionally, annular protrusion 252B helps to maintain interior rod guide assembly 230 in position when acted upon by piston 222 (i.e., protrusion 252B keeps assembly 230 from being pushed in the rightward direction), and annular protrusion 252C helps to maintain the dividing member 210 in position when acted upon by piston 242 (i.e., protrusion 252C keeps dividing member 210 from being pushed in the leftward direction).

Figure 13:
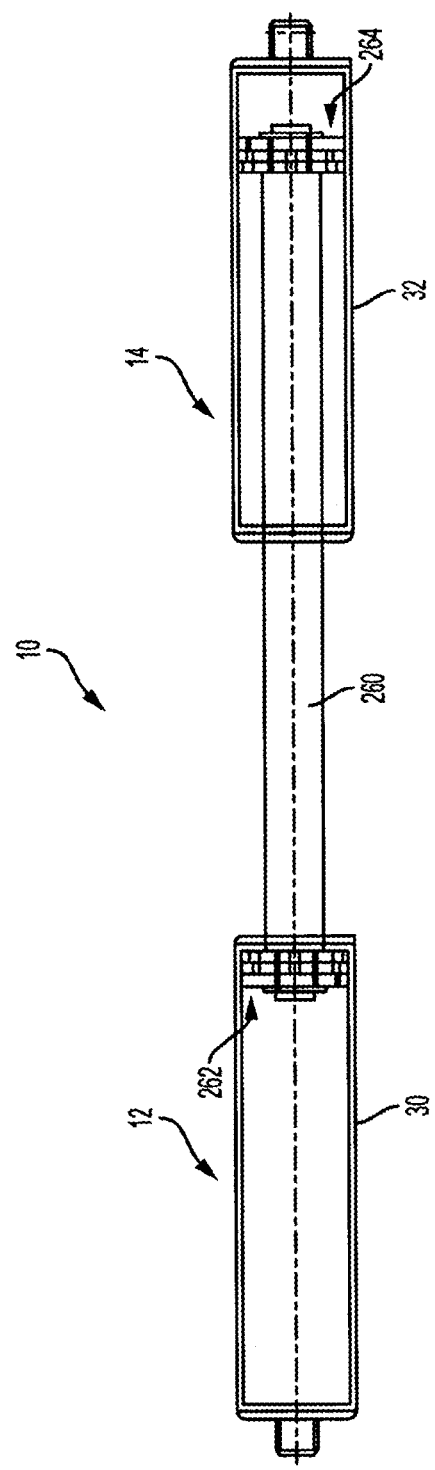
FIG. 13 is a schematic cutaway view of yet another embodiment of the present steering assist member, wherein this embodiment includes a single piston rod extending through both the first and second sections.

Turning now to FIG. 13, a cutaway view of another embodiment of the present centering stabilizer/steering assist member 10 is shown and will be discussed. One of the main features of this embodiment is that there is a single piston rod 260 utilized by both the first section 12 and the second section 14. In this embodiment, the first section 12 is a push-type gas spring and the second section 14 is a gas traction spring (i.e., a gas pull-type spring), but of course these two components could be reversed. If desired, an additional covering member (not shown) may be provided over the entire centering stabilizer/steering assist member 10 of FIG. 13.

As can be seen in FIG. 13, the first section 12 includes a first cover 30 within which is provided a pressurized gas, such as nitrogen, and a small amount of lubricant, as with the other embodiments. This first section 12 includes a first piston 262 attached to a one end (a first end) of the single piston rod 260. This first piston 262 is configured in any desired manner, such as described with regard to the other embodiments.

As can also be seen in FIG. 13, the second section 14 includes a second cover 32 within which is provided a pressurized gas, such as nitrogen, and a small amount of lubricant, as with the other embodiments. This second section 14 includes a second piston 264 attached to the other end (a second end) of the single piston rod 260. This second piston 264 is configured in any desired manner, such as described with regard to the other embodiments.

In this embodiment of FIG. 13, as with all of the other embodiments, the specific structures of the first and second sections 12, 14 may be configured as described in any of the disclosed embodiments, or with a different configuration, as long as one of the first and second sections provides a pulling force and the other of the first and second sections provided a pushing force. Thus, for example, the relevant structures of the first and second sections of FIG. 12 could be provided in the FIG. 13 embodiment, with the primary difference being that in the FIG. 13 embodiment, the piston rods of the first and second sections are comprised of a single rod that extends between both sections.

Figure 14:
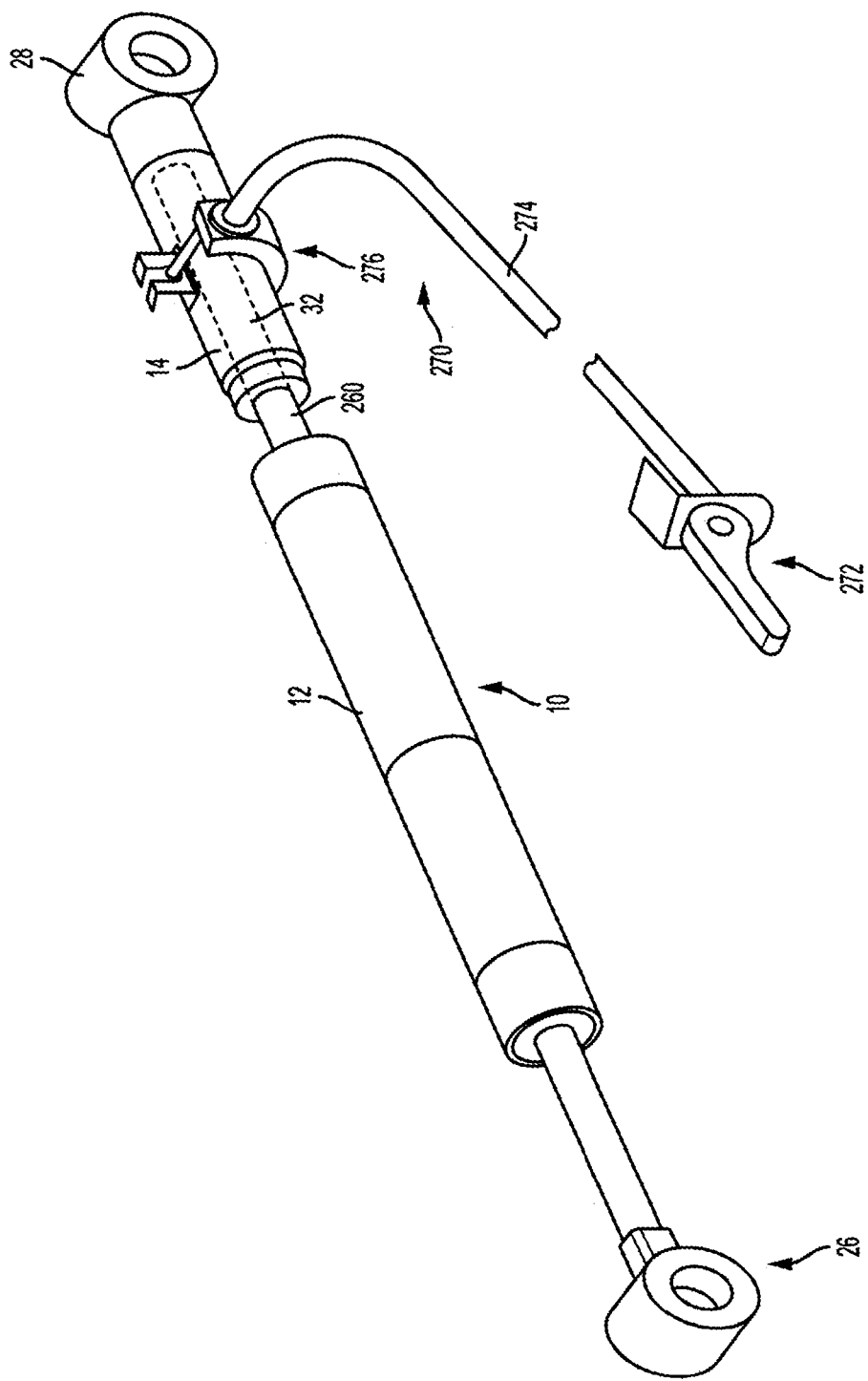
FIG. 14 is a perspective view of the steering assist member of FIG. 13 that includes an adjustable trim device.

Turning now to FIG. 14, this embodiment shows the present centering stabilizer/steering assist member 10 paired with a dynamically adjustable trim device 270, which allows for the driver to make adjustments while driving. In the embodiment shown in FIG. 14, the centering stabilizer/steering assist member 10 is configured as depicted in FIG. 13 (i.e., with a single piston rod extending through both the first and second sections 12, 14). However, it is contemplated that other configurations of centering stabilizers/steering assist members could be used with trim device 270.

In the FIG. 14 embodiment, the first section 12 is configured as a push-type gas spring, and the second section 14 is configured as a pull-type (traction) gas spring. As with the other embodiments, a first mounting means 26 is provided at one end and a second mounting means 28 is provided at the opposite end. The first mounting means 26 may be rigidly attached to the frame of an automobile, and the second mounting means 28 may be attached to the tie rod of the vehicle's steering system, as described with regard to the other embodiments. Alternative connecting configurations, including both alternative connecting means as well as alternative locations for connection, are also contemplated.

The adjustable trim device 270 includes a toggle lever 272 (or similar switching device) that is connected to a Bowden cable 274 (or other similar means for transferring a pulling force), which is also connected to an adjustable clamping assembly 276. The adjustable clamping assembly 276 extends through an aperture in the cover 32 of the second section 14 such that the toggle switch 272 can be operated to allow for the clamping assembly 276 to be in either an open position, which allows for the single piston rod 260 to slide freely within the assembly 276, or a locked position, in which the clamping assembly 276 is tightly clamped around the single piston rod 260, preventing the rod 260 from sliding within the cover 32. The adjustable clamping assembly including a biasing means (such as a coil spring), not shown, which maintains it in the locked position until the toggle switch is moved to the open position and the force of the wire within the Bowden cable counteracts the biasing force of the biasing means. The adjustable trim device 270 of FIG. 14 serves essentially the same purpose as the dynamically adjustable mount 140 of FIG. 7 (i.e., effectively adjusting the functional length of the device, which effectively changes the resulting "centering" force upon the tie rod 162 in one direction or the other to compensate for an original mis-alignment or a changed condition).

Turning now to FIGS. 15-19C, this embodiment shows a centering assembly 300 that includes the present centering stabilizer/steering assist member 10 paired with another type of dynamically adjustable trim device (such as trim lock 310), which allows for the driver to make adjustments while driving. In the embodiment shown in FIG. 15-19C, the centering stabilizer/steering assist member 10 is configured as depicted in FIG. 13. However, it is contemplated that other configurations of centering stabilizers/steering assist members (including those disclosed herein, as well as other types of centering stabilizers/steering assist members) could be used with trim device 310. Also, other types of trim devices could be used in the centering assembly 300 shown in FIGS. 15-19C.

In the embodiment of FIGS. 15-19C, the first section 12 is configured as a push-type gas spring, and the second section 14 is configured as a pull-type (traction) gas spring, but these sections could be reversed. As with the other embodiments, a first mounting means 26 is provided at one end and a second mounting means 28 is provided at the opposite end. The first mounting means 26 may be rigidly attached to the frame of an automobile, and the second mounting means 28 may be attached to the tie rod of the vehicle's steering system, as described with regard to the other embodiments. Alternative connecting configurations, including both alternative connecting means as well as alternative locations for connection, are also contemplated.

More specifically, FIGS. 15-19C show a centering assembly 300 (including a centering stabilizer 10 and a trim lock 310) that is configured and arranged to provide a centering force between a first portion of a system (such as a steering system of a vehicle) and a second portion of the system, where the system is configured and arranged to be acted upon by a centering force. The centering stabilizer 10 is configured and arranged to provide a centering force along an axial direction thereof (e.g., the horizontal direction, as shown in the FIG. 15 orientation), where the centering stabilizer 10 extends between a first axial end 302 (FIGS. 15 and 16) and a second axial end 304 (FIG. 18), and further where the first axial end of the centering stabilizer 10 is connected to a first portion of the system, such as via the first mounting means 26.

Figure 18:
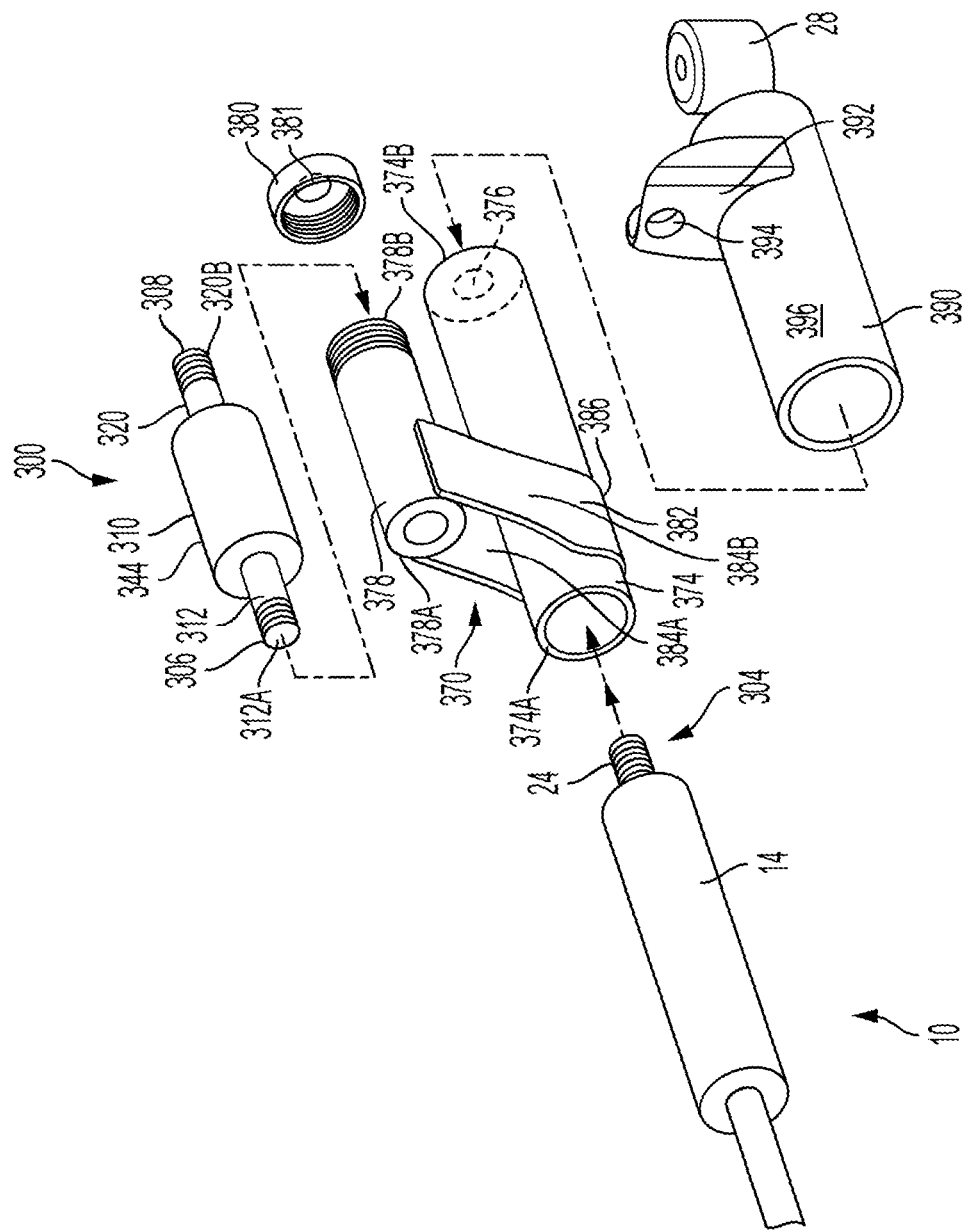
FIG. 18 is an exploded perspective view of the centering assembly of FIG. 15, showing both the centering stabilizer and the trim lock, as well as the connecting unit for connecting these components together.

The trim lock 310 is configured and arranged to change a location of the second axial end 304 (FIG. 18) of the centering stabilizer 10, with respect to the second portion of the system (which is connected to the second mounting means 28) between an original location and an adjusted location, and to lock the second axial end 304 of the centering stabilizer 10 at the adjusted location. As can be seen in FIG. 18, the trim lock 310 extends in an axial direction between a first axial end 306 and a second axial end 308.

Figure 17:
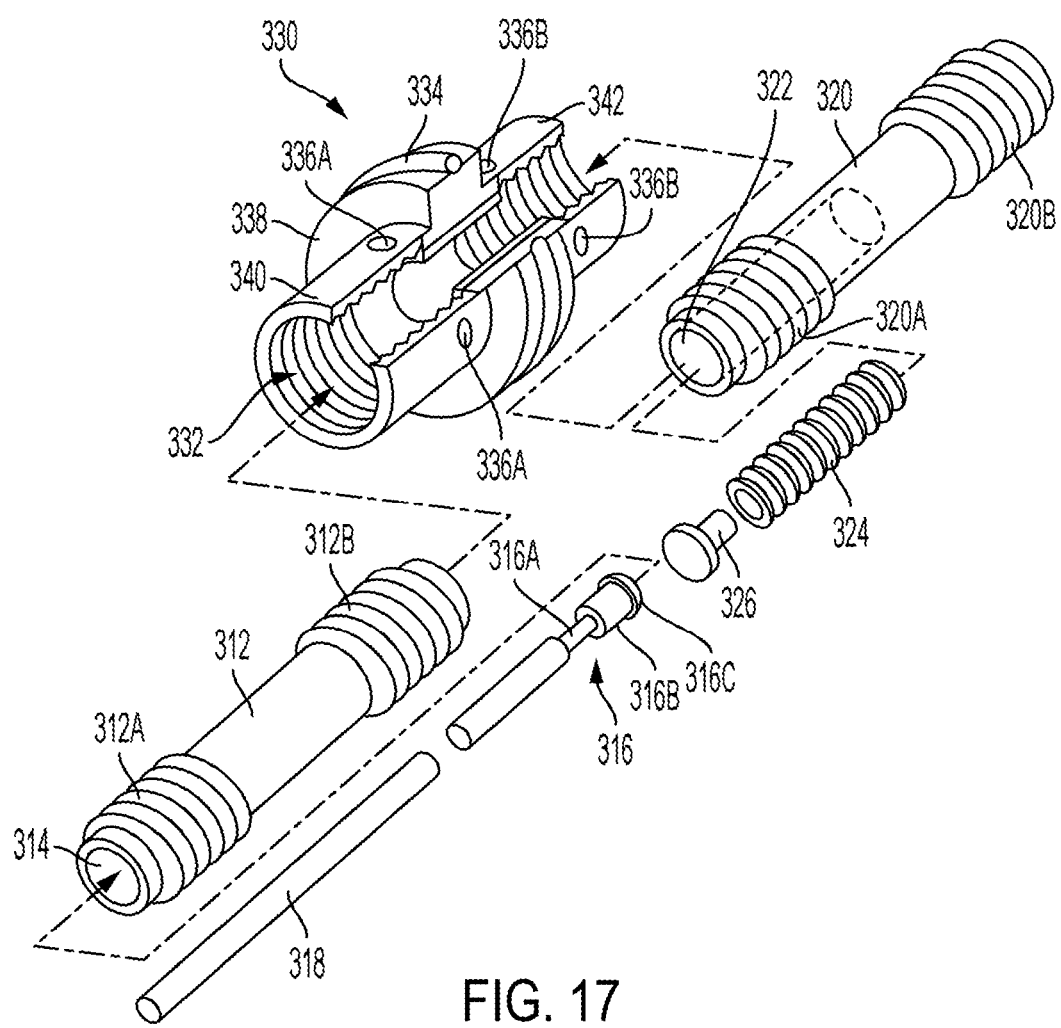
FIG. 17 is an exploded perspective view of the trim lock of FIG. 15.

The details of the trim lock 310 of this embodiment will be described next, with reference to FIGS. 17-19C. The preferred embodiment of the trim lock 310 includes, as best seen in FIGS. 17, 19A, 19B and 19C, a first shaft 312 that extends in a first axial direction between a first end 312A and a second end 312B. As can be seen in FIG. 17, the first and second ends 312A and 312B are preferably threaded for connection with other components, as described hereinbelow. The first shaft 312 also includes a first aperture 314 that extends completely through the first shaft 312 in the first axial direction.

As best seen in FIG. 17, there is a spool valve piston 316 seated within the first aperture 312, wherein the spool valve piston 316 is configured and arranged for movement in the first axial direction with respect to the first shaft 312. The spool valve piston 316 includes a valve shaft 316A and a land portion 316B adjacent to the valve shaft 316A. As can be seen in FIG. 17, the land portion 316B is of a larger diameter than the valve shaft 316A. A push pin 318 is also seated within the first aperture 314 of the first shaft 312, wherein the push pin 318 is configured and arranged to be moved within the first aperture 314 in the first axial direction by a moving means (as described hereinbelow).

FIGS. 17-19C also show how the present trim lock 310 also includes a second shaft 320 extending in a second axial direction between a first end 320A and a second end 320B, wherein the second shaft 320 includes a second aperture 322 that extends from the first end 320A of the second shaft 320 in the second axial direction. As can be seen by the dashed lines in FIG. 17, the second aperture 322 does not extend completely through the second shaft 320, but instead terminates at an intermediate location within the shaft 320. A spring 324, or other type of biasing member, is seated within the second aperture 322, and a push plug 326 is seated within one end of the spring, whereby the push plug 326 can move axially within the second aperture 322 in response to a biasing force from the spring 324.

The first shaft 312 and the second shaft 320 are connected to each other by an intermediate member 330. More specifically, the intermediate member 330 is rigidly secured to both the second end 312B of the first shaft 312 and to the first end 320A of the second shaft 320 by any known connection means, such as the threaded connections shown in FIG. 17. The intermediate member 330 includes a third aperture 332 that completely extends through the intermediate member 330 in a third axial direction. When the first shaft 312, the second shaft 320 and the intermediate member are assembled together, the third axial direction of the intermediate member 330, the second axial direction of the second shaft 320 and the first axial direction of the first shaft 312 are all aligned with each other.

A seal 334, such as an o-ring, is provided around the intermediate member 330, as best shown in FIG. 17. Specifically, the seal 334 is provided on an outer periphery of an enlarged diameter portion 338 of the intermediate member 330, wherein the enlarged diameter portion 338 separates a first section 340 of the intermediate member 330 from a second section 342 of the intermediate member 330.

Additionally, as can be seen in FIG. 17, a plurality of ports 336A and 336B are also provided on the intermediate member 330, where there is at least one port 336A on the first section 340 of the intermediate member 330, and at least one port 336B on the second section 342 of the intermediate member 330. In the preferred embodiment, there are four ports 336A on the first section 340 and four ports 336B on the second section 342, although fewer than four or more than four ports can be provided on each of the sections, as desired. Regardless of the number of ports provided, each of the ports 336a/336B passes from the outer periphery of the intermediate member 330 to the third aperture 332 of the intermediate member 330, thereby enabling fluid communication with the third aperture 332. As described below, the ports 336B on the second section 342 of the intermediate member 330 may be blocked when the spool valve piston 316 is in a certain axial position, and thus these ports 336B may be considered as being in selective fluid communication with the third aperture 332.

Figure 19A:
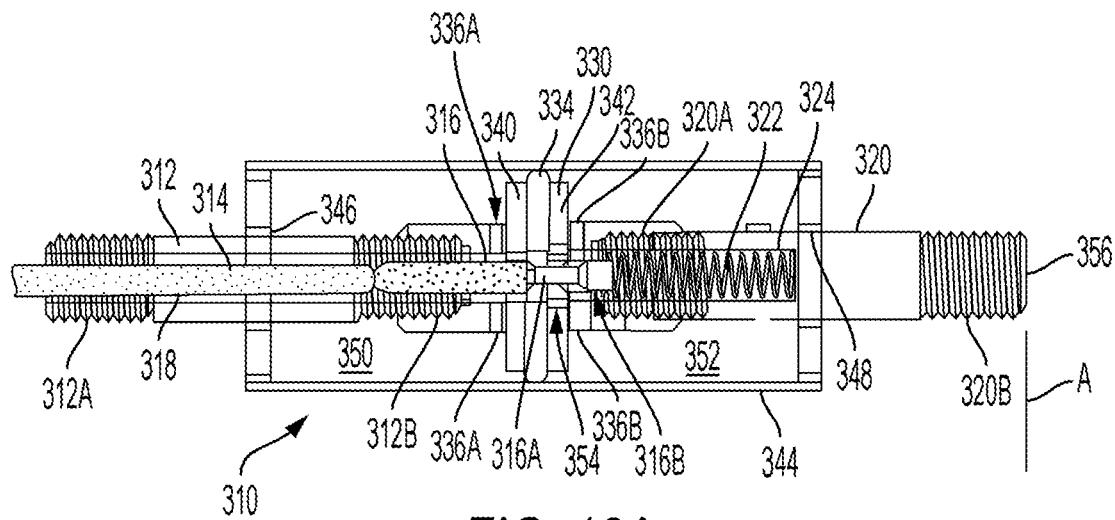
FIGS. 19A, 19B and 19C are partially cut-away side views showing the trim lock of FIG. 15 in a closed state (FIG. 19A) in a neutral, center position; an open state (FIG. 19B) with the exposed portion of the right portion of the shaft extended with respect to the FIG. 19A condition; and in an open state (FIG. 19C) with the exposed portion of the right portion of the shaft shortened with respect to the FIG. 19A condition.
Figure 19B:
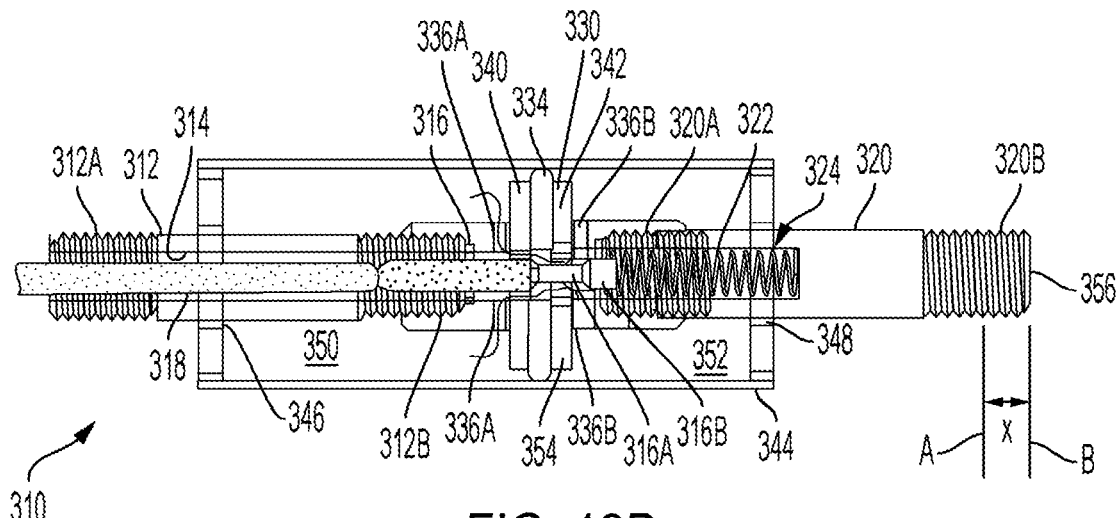
Figure 19C:
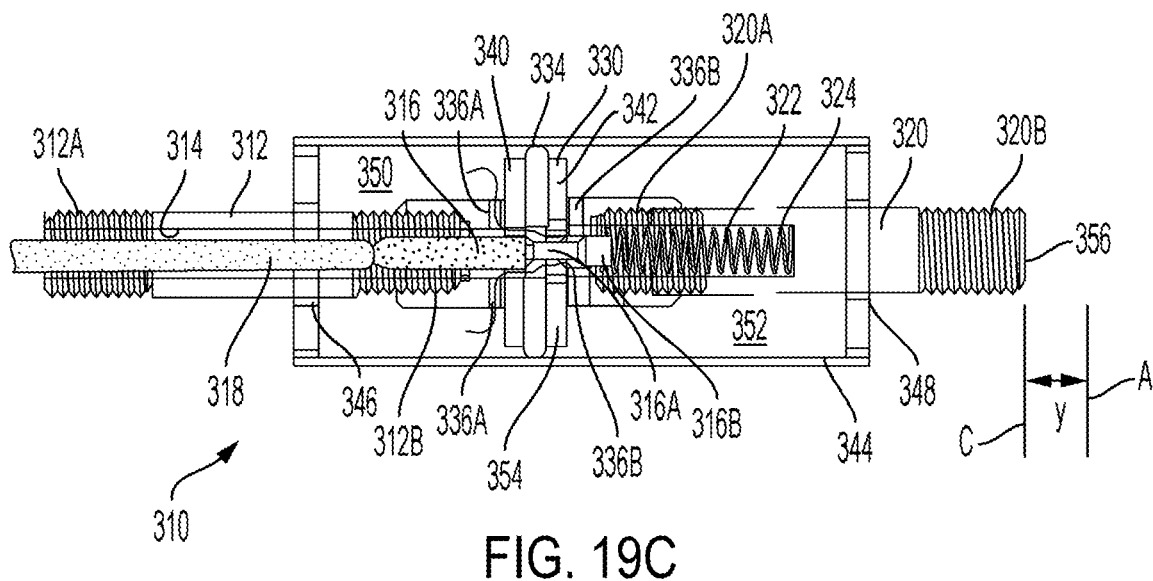

FIGS. 19A-19C are partially cut-away views that show the trim lock 310 in the assembled condition. A cover member 344, which is preferably cylindrical in shape, is provided, and the interior of the cover member 344 is filled with a fluid, such as hydraulic oil. In the assembled condition, the second end 312B of the first shaft 312 is rigidly connected to one side of the intermediate member 330, such as by a threaded connection, as shown, or by other suitable connection means, and the first end 320A of the second shaft 320 is rigidly connected to one side of the intermediate member 330, such as by a threaded connection, as shown, or by other suitable connection means.

The first shaft 312 extends through an opening (a first opening) in one end of the cover member 344, and there is a seal 346, such as an annular shaft seal, provided at the interface between the shaft 312 and the opening to prevent the fluid from through this opening in the cover member 344 when the shaft 312 moves in the axial direction. Similarly, the second shaft 320 extends through an opening (a second opening) in the other end of the cover member 344, and there is a seal 348, such as an annular shaft seal, provided at the interface between the shaft 320 and the opening to prevent the fluid from through this opening in the cover member 344 when the shaft 320 moves in the axial direction. This cover member 344 is preferably made of metal, and can be relatively small in the axial direction, such as approximately about 3 inches, although other lengths are contemplated.

As can be seen in FIGS. 19A-19C, the intermediate member 330 defines a first fluid filled chamber 350 and a second fluid filled chamber 352 within the cover member 344. The intermediate member 330 is slidably positioned between the first fluid filled chamber 350 and the second fluid filled chamber 352, and the o-ring 334 prevents fluid from passing around the outer periphery of the intermediate member 330 between chambers 350 and 352. When the intermediate member 330 slides in one direction (such as towards the right, as can be seen when comparing FIG. 19A with FIG. 19B), an axial length (and the volume) of the first fluid filled chamber 350 increases and an axial length (and the volume) of the second fluid filled chamber 352 decreases. In contrast, when the intermediate member 330 slides in a direction opposite to the one direction (such as towards the left, as can be seen when comparing FIG. 19A with FIG. 19C), the axial length (and the volume) of the first fluid filled chamber 350 decreases, and the axial length (and the volume) of the second fluid filled chamber 352 increases.

Figure 20A:
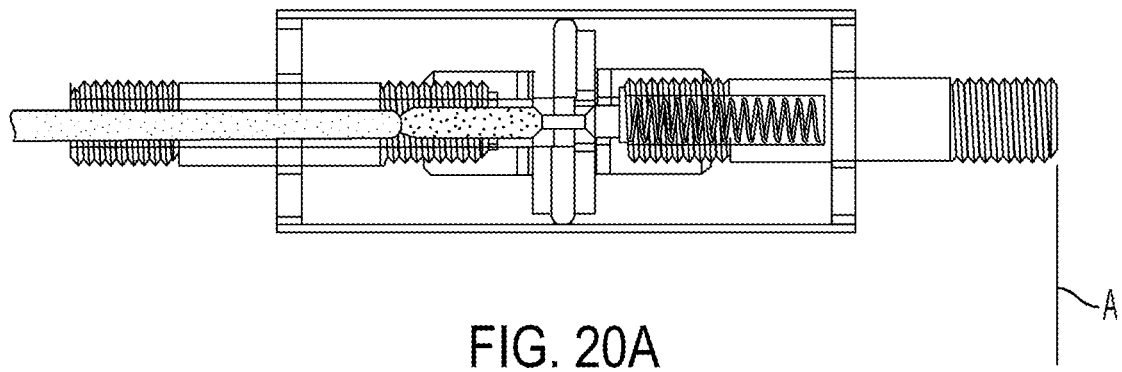
FIGS. 20A, 20B and 20C are simplified, slightly enlarged views of the trim lock in the states of FIGS. 19A, 19B and 19C, respectively, shown without reference numbers to highlight the flow paths.
Figure 20B:
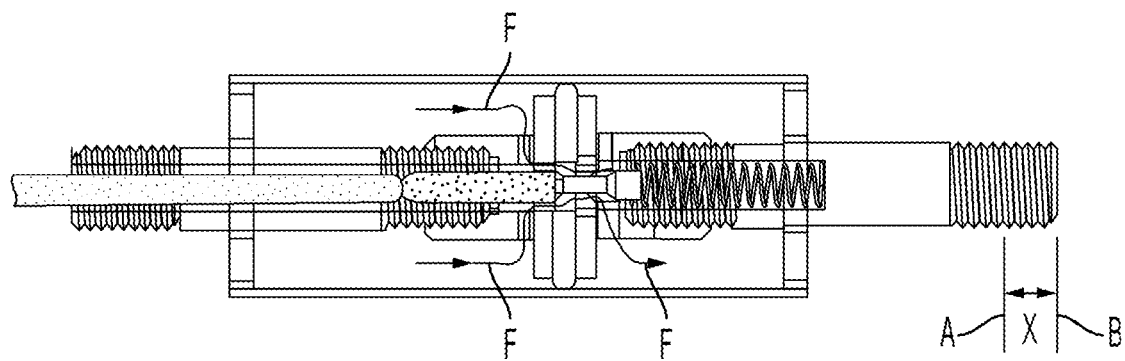
Figure 20C:
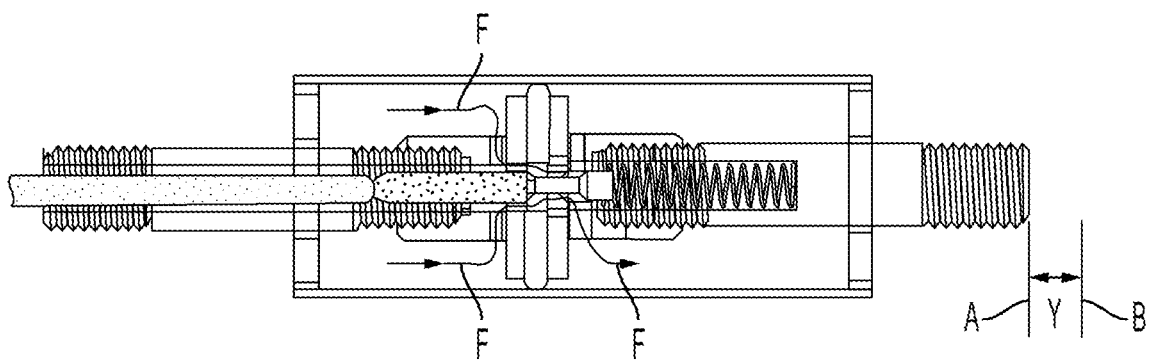

Operation of the trim lock 310 will now be described while referring to FIG. 19A-19C, where FIG. 19A shows the trim lock 310 in the locked position, with the push pin 318 in the neutral (or "out") position, where no fluid passes between the first chamber 350 and the second chamber 352, and FIGS. 19A and 19B both show the trim lock 310 in the unlocked position, with the push pin 318 engaged (or in the "pushed in" position). FIGS. 20A, 20B and 20C are simplified, slightly enlarged views of the trim lock in the states of FIGS. 19A, 19B and 19C, respectively, shown without reference numbers to highlight the flow paths.

Although not shown in FIGS. 19A-19C, the push pin 318 may be moved between the neutral (or "out") position and the engaged (or "pushed in") position by any known moving means, such as via a Bowden cable, hydraulically, electronically, etc.). Examples of such moving means include Bowden wire and button configurations (such as the Easytouch by Wire system sold by Bansbach Easylift of North America), a hydraulic hose and button configuration (such as the Easytouch system sold by Bansbach Easylift of North America), other similar release systems sold by McMaster-Carr Supply of Illinois, as well as solenoid based electronic systems, all of which would be known to those of ordinary skill in the art.

More specifically, FIG. 19A shows how when the push pin 318 is in the out position 9 (i.e., it has not been pushed inwardly, to the right, as shown in the figure), the land portion 316B of the spool valve piston 316 makes sealing contact with an annular sealing member 354, thereby closing the valve formed by the spool valve piston 316, and preventing the fluid from passing from the first chamber 350 to the second chamber 352, and vice versa, via the relevant portion of the third aperture 332 within the intermediate member 330. When the trim lock 310 is in the locked position, with the spool valve piston 316 in the closed position (i.e., with the land portion 316B aligned with the port(s) 336B of the second section 342 such that fluid communication between the first chamber 350 and the second chamber 352 is blocked), as in FIG. 19A, the distal end 356 of the second shaft 320 is aligned with line A. Since the flow between the first chamber 350 and the second chamber 352 is blocked in the condition of FIG. 19A, corresponding FIG. 20A does not include any flow lines.

FIGS. 19B and 19C (and corresponding FIGS. 20B and 20C, respectively) show two different situations in which the push pin 318 is in the pushed-in position, and the fluid is free to flow between the first chamber 350 and the second chamber 352 (as indicated by the flow lines F in corresponding FIGS. 20A and 20B). In the condition shown in FIG. 19B, the distal end 356 of the second shaft 320 is aligned with line B, which, when compared with line A, shows that the second shaft 320 has been extended (moved to the right) by length "x". In contrast, in the condition shown in FIG. 19C, the distal end 356 of the second shaft 320 is aligned with line C, which, when compared with line A, shows that the second shaft 320 has been shortened (moved to the left) by length "y". In other words, the exposed length of the second shaft 320 of said trim lock 310 is adjustable (where the "exposed length" is the length of the shaft 320 that extends outside of the cover member 344) when the push pin 318 is moved by any known moving means (such as via a Bowden cable, hydraulically, electronically, etc.). The distances "x" and "y" can be designed to be any desired length, but it is contemplated that these distances will be relatively small, such as between ⅛ of an inch and one inch.

In the conditions of FIGS. 19B and 19C (and corresponding FIGS. 20B and 20C, respectively), the fluid is allowed to freely pass between the first chamber 350 and the second chamber 352 because the valve shaft portion 316A (which is of a smaller diameter than the land portion 316B) of the spool valve piston 316 is aligned with the annular seal member 354 (i.e., the spool valve piston 316 is in the open position). Since the valve shaft portion 316A is of a smaller exterior diameter than the interior diameter of the annular seal member 354, the valve shaft portion 316A is out of contact with the annular seal member 354, thereby allowing fluid to pass therebetween (as represented by flow lines F of corresponding FIGS. 20B and 20C). With the fluid able to flow freely between the first chamber 350 and the second chamber 352 (via the gap between seal member 354 and valve shaft portion 316A), the intermediate member 330 (and the attached shafts 312 and 320) can freely move to the right (FIGS. 19B and 20B) or the left (FIGS. 19C and 20C) until the pressure between both chambers 350/352 has been equalized. Once the desired equilibrium has been realized, the engagement of the push pin 318 can be stopped, and the spring 324 will bias against the push plug 326, which in turn biases against the end 316C (FIG. 17) of the spool valve piston 316, forcing the valve into the closed position (with the land portion 316B of the spool valve piston 316 in sealing contact with the annular sealing member 354).

Figure 15:
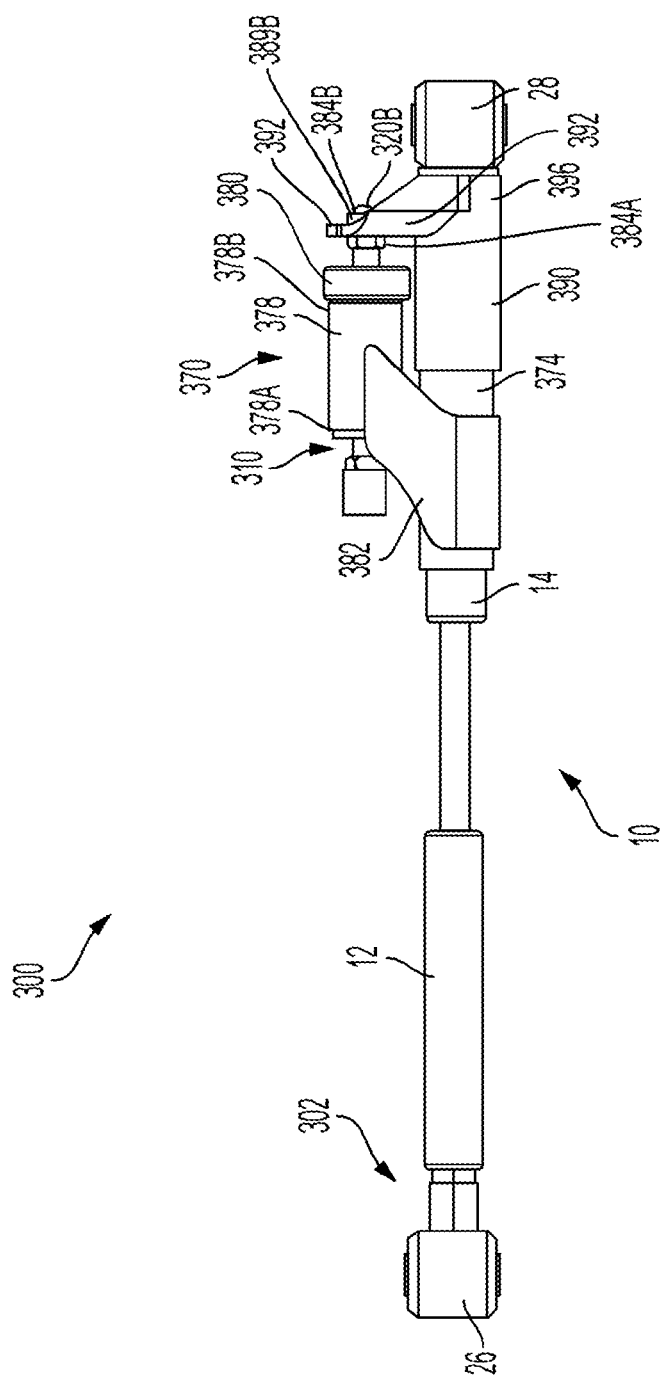
FIG. 15 is a side view of another embodiment of a centering assembly that includes both a centering stabilizer and a trim lock.
Figure 16:
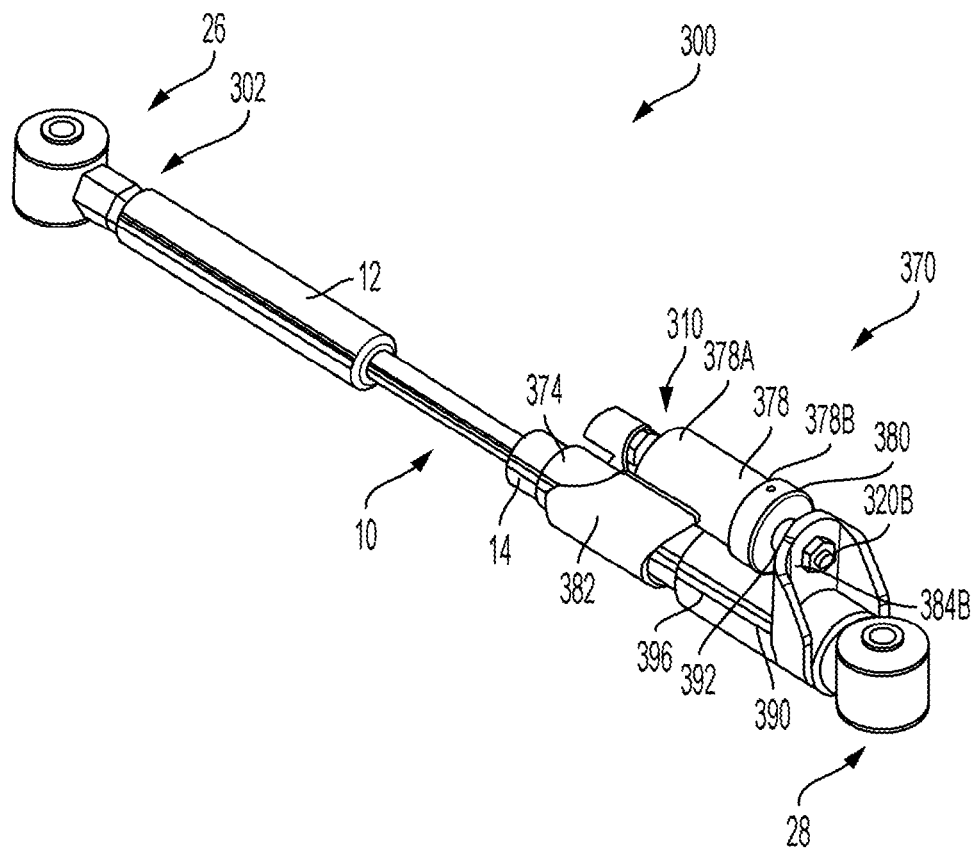
FIG. 16 is a perspective view of the centering assembly of FIG. 15.

Turning now to FIGS. 15, 16 and 18, a connecting unit, such as connecting unit 370, for connecting the trim lock 310 and the centering stabilizer 10 will be described. More specifically, the connecting unit 370 operatively connects the trim lock 310 with the centering stabilizer 10 in such a manner that the distance between one of the axial ends of the centering stabilizer 10 can be moved in the axial direction by a small amount with respect to one of the mounting points of the system (such as steering system) that is acted upon by the centering force, and then locked in that position, thereby changing the effective axial length of the centering stabilizer with respect to the two mounting points of the system. As explained below, this is achieved by rigidly connecting one end of the centering stabilizer 10 with a portion of the body (such as the cover member 344) of the trim lock 310, such that as the body of the trim lock is moved in the axial direction, the body of the centering stabilizer 10 is moved a corresponding amount in the same direction.

As can be seen in FIG. 18, the connecting unit 370 is rigidly connected to both the second axial end 320B of the trim lock 310 and the second axial end 24 of the centering stabilizer 10 in such a manner that the axial direction defined by the centering stabilizer 10 and the axial direction defined by the trim lock 310 are maintained in an essentially parallel relationship with each other.

The connecting unit 370 mainly consists of a primary housing 374 for receiving and maintaining the centering stabilizer 10 therein; a secondary housing 378 for receiving and maintaining the trim lock 310 therein; and a bridging portion 382 that connects that primary housing 374 and the secondary housing 378, and that maintains these two components (374 and 378) in a fixed relationship with respect to each other.

The primary housing 374, which, in this embodiment, is preferably made of metal and consists essentially of a tube (also referred to as a first tube), extends from a first axial end 374A to a second axial end 374B. The second axial end 374B of the primary housing and the second axial end 24 of the centering stabilizer 10 are rigidly connected to each other in any desired manner, such as by the rigid connection formed by passing a threaded portion of the second axial end 24 of the stabilizer 10 through an aperture 376 (FIG. 18), and fixing a nut (not shown) to the threaded portion of the axial end 24. The aperture 376 may be provided directly in the end of the primary housing 374, or it may be provided in a removable cap portion (not shown) that is rigidly fixed to the end of the primary housing.

The secondary housing 378 which, in this embodiment, is preferably made of metal and consists essentially of a tube (also referred to as a second tube), also extends from a first axial end 378A to a second axial end 378B. The trim lock 310 is inserted into the secondary housing 378, and a cap 380 with an aperture 381 (FIG. 18) therein is affixed to the second end 378B of the secondary housing 378 in any desired manner, such as via a set of mating threads. The end 320B of the second axial shaft 320, which is preferably threaded, is passed through the aperture 381 in the cap 380, and a pair of nuts 384A and 384B are secured to the shaft end 320B, with one nut on each side of a shoulder 392 (with an aperture 394 therein (see FIG. 18)), which rigidly attaches the shaft end 320B to a mounting member 390, which will be described below, after the bridging portion 382 is described.

The bridging portion 382, which is also preferably made of metal, includes a pair of legs 384A and 384B (FIG. 18) that each extend between the primary housing 374 and the secondary housing 378, and thereby rigidly connect these two components together. In the embodiment of FIG. 18, the bridging portion 382 is a generally u-shaped member that includes the legs 384A/384b and a base section 386 connects the legs together and at least partially surrounds a portion of the primary housing 374. The bridging portion 382 may be welded to the primary housing 374 and the secondary housing 378. Alternatively, the bridging portion 382 may be integrally formed with either the primary housing 374 or the secondary housing 378, and then welded to the other component, or the three components (the primary housing, the secondary housing and the bridging portion) may all be integrally formed as a single component. Alternate configurations of the bridging section are also contemplated, such as merely including a spacer member between housings 374 and 378 to attach these members together, without the need for a pair of legs, or even directly attaching or forming housings 374 and 378 together, without a spacer therebetween.

Turning again to the mounting member 390 of FIGS. 15, 16 and 18, this component is designed to movably mount the centering stabilizer 10 to the second portion of the system, such as a steering system via, for example, the second mounting means 28, or other suitable mounting member. As will become evident from the following discussion, the mounting member 390 is configured and arranged to permit axial movement of the centering stabilizer 10 with respect to the second portion of the steering system, or whatever other system the present invention is applied to.

In this embodiment, the mounting member 390, which is preferably made of metal, includes a hollow sleeve 396, and the shoulder 392 extends from the hollow sleeve 396. The hollow sleeve 396 is configured and arranged to slidably receive a portion of the connecting unit 370 therein. In particular, the hollow sleeve 396 slidably receives the primary housing 374 of the connecting unit 370 therein. The shoulder 392 may be integrally formed with the hollow sleeve 396, or it may be a separate component that is welded or otherwise rigidly affixed, to the hollow sleeve 396. Similarly, the mounting n member 390 may be integrally formed with the second mounting means 28, or it may be formed of one or more separate components that at welded, or otherwise rigidly affixed, to the second mounting means 28.

One example of the operation of the present centering assembly 300 when installed in a steering system, such as a steering system of a vehicle, will be discussed next. As mentioned above, and in the same manner as explained with regard to the other embodiments, one of the mounting means (such as mounting means 26) is affixed to a rigid, non-movable (by the steering wheel) component, such as the vehicle frame, and the other mounting means (such as mounting means 28) is connected to a movable (by the steering wheel) component of the steering system, such as to the linkage/tie rod. One of the benefits of the centering assembly 300 is that if the system has not been installed with respect to the steering wheel at the exact centered position, the user can utilize the system to make very fine adjustments (for example, by about ¼ of an inch, or less). Additionally, they system can also be used to make on-the fly adjustments where the driving or road conditions have changed, such as when driving in high side winds, on a crowned road, or with an unevenly distributed load.

After the centering assembly 300 has been installed, when the user intends to activate the device, the button (or other activation means) on the moving means is engaged, which causes the push pin 318 to be pushed inwardly within the first shaft 312 (such as shown when comparing the pin-out location of the push pin 318 in FIG. 19A with the pushed-in location of FIG. 19B). The push pin 318 pushes the spool valve piston 316 inwardly, thereby moving it from the closed position of FIG. 19A in which the ports 336B are sealed by annular seal member 354 when the land portion 316B is aligned with the ports 336B to the open position of FIG. 19B or and FIG. 19C. In FIGS. 19B and 19C, the reduced diameter valve shaft portion 316A of the spool valve piston 316 is aligned with the ports 336B, and the annular seal member 354 is spaced from the valve shaft portion 316A, which allows fluid to freely flow between the first chamber 350 and the second chamber 352.

In the open condition of FIGS. 19B and 19C, and with the fluid freely flowing between the first chamber 350 and the second chamber 352, the shafts 312 and 320 (and the intermediate member 330) also move freely to the left and right with respect to the cover member 344. As can be seen in FIGS. 15 and 16, the end 320B of the second shaft is rigidly attached to the mounting member 390 via the shoulder 392, and the cover member 344 (FIG. 18) of the trim lock 310 is constrained within the secondary housing 378 of the connecting unit 370. Additionally, the secondary housing 378 is rigidly fixed to the primary housing 374; the distal end 24 of the stabilizer 10 is secured to the end of the primary housing 374; and the primary housing 374 is free to slide within the hollow sleeve 396. Accordingly, the axial location of the distal end 24 of the stabilizer 10 with respect to the mounting means 28 can be changed by a limited amount to automatically adjust the center of the centering assembly 300. Thus, in the open position of FIGS. 19B and 19C, the effective length of the stabilizer 10 can be changed because the distal end 24 of the stabilizer 10 can be moved in the axial direction with respect to the mounting means 28, and the changed length can be locked by stopping engagement of the button (or other activation means) on the moving means, at which point the spring 324 biases the push plug 326 and adjacent spool valve piston 316 to the left, thereby closing the valve defined between the land portion 316B and annular seal member 354 and locking the trim lock 310.

It should be noted that although the various embodiments of the devices described herein may be referred to as a steering assist member, a centering member, a centering stabilizer/steering assist member, etc., each of the devices is contemplated for use as part of a vehicle steering system, as well as for use in other environments where a centering force is desired, such as in two-way doors, gates, hatches, etc.

While various embodiments of the present invention have been shown and described, it should be understood that other modifications, substitutions and alternatives may be apparent to one of ordinary skill in the art. Such modifications, substitutions and alternatives can be made without departing from the spirit and scope of the invention, which should be determined from the appended claims.

Various features of the invention are set forth in the appended claims.

What is claimed is:

1. A trim lock comprising:
   a first shaft extending in a first axial direction between a first end and a second end, wherein said first shaft includes a first aperture extending completely through said first shaft in said first axial direction;
   a second shaft extending in a second axial direction between a first end and a second end, wherein said second shaft includes a second aperture extending from said first end of said second shaft in said second axial direction;
   an intermediate member rigidly secured to both the second end of said first shaft and the first end of said second shaft, wherein said intermediate member includes a third aperture extending therethrough in a third axial direction, wherein said third axial direction, said second axial direction, and said first axial direction are all aligned with each other;
   at least one first port formed within a first section of said intermediate member, wherein said at least one first port is in fluid communication with said third aperture;
   at least one second port formed within a second section of said intermediate member, wherein said at least one second port is in selective fluid communication with said third aperture;
   a spool valve piston seated within said first aperture, wherein said spool valve piston is configured and arranged for movement in said first axial direction with respect to said first shaft, wherein said spool valve piston includes a valve shaft and a land portion, and further wherein the land portion is of a larger diameter than the valve shaft;

a push plug seated within said second aperture, wherein one end of said push plug is configured and arranged to make contact with one end of said spool valve piston;

a biasing member seated within said second aperture, wherein said biasing member is configured and arranged to bias said spool valve piston; and a cover member including a first opening for slidably receiving said first shaft and a second opening for slidably receiving said second shaft, wherein said intermediate member is configured and arranged to define a first fluid filled chamber and a second fluid filled chamber within said cover member, wherein said intermediate member is slidably positioned between said first fluid filled chamber and said second fluid filled chamber such that when said intermediate member slides in one direction an axial length of said first fluid filled chamber increases and an axial length of said second fluid filled chamber decreases and when said intermediate member slides in a direction opposite to the one direction, the axial length of said first fluid filled chamber decreases and the axial length of said second fluid filled chamber increases, and wherein said spool valve piston is configured and arranged to be moved between a closed position in which said land portion is aligned with said at least one second port and fluid communication between said first and second chambers is blocked and an open position in which said land portion is out of alignment with said at least one second port and fluid passes between said first and second chambers.

2. The trim lock according to claim 1, wherein:

the second end of said first shaft and said first section of said intermediate member are configured and arranged to be connected to each other via a first threaded connection; and the first end of said second shaft and said second section of said intermediate member are configured and arranged to be connected to each other via a second threaded connection.

3. The trim lock according to claim 1, wherein said intermediate member comprises an enlarged diameter section, wherein said enlarged diameter section is positioned between said first and second sections, wherein said enlarged diameter section is of a diameter that is larger than that of said first section and that of said second section, and said enlarged diameter section includes an o-ring seated on an outer periphery thereof.

4. The trim lock according to claim 3, wherein:

said at least one first port comprises four first ports; and
said at least one second port comprises four second ports.

5. The trim lock according to claim 1, further comprising a push pin within said first aperture of said first shaft, wherein said push pin is configured and arranged to be moved in the first axial direction by a moving means.

6. The trim lock according to claim 1, wherein a fluid within said first and second fluid filled chambers comprises hydraulic oil.

7. A centering assembly configured and arranged to provide a centering force between a first portion of a system and a second portion of the system, wherein the system is configured and arranged to be acted upon by a centering force, said centering assembly comprising:

a centering stabilizer configured and arranged to provide a centering force along an axial direction thereof, said centering stabilizer extending between a first axial end and a second axial end, wherein said first axial end of said centering stabilizer is connected to the first portion of the system;

a trim lock configured and arranged to change a location of the second axial end of the centering stabilizer, with respect to the second portion of the system, between an original location and an adjusted location, and to lock the second axial end of the centering stabilizer at the adjusted location, and wherein said trim lock extends in an axial direction between a first axial end and a second axial end;

a connecting unit for operatively connecting said trim lock with said centering stabilizer, wherein said connecting unit is rigidly connected to both the second axial end of the trim lock and the second axial end of the centering stabilizer in such a manner that the axial direction defined by the centering stabilizer and the axial direction defined by the trim lock are maintained in an essentially parallel relationship with each other; and a mounting member for movably mounting said centering stabilizer to said second portion of the system, wherein said mounting member is configured and arranged to permit axial movement of said centering stabilizer with respect to said second portion of the system.

8. The centering assembly according to claim 7, wherein said connecting unit comprises:

a primary housing configured and arranged to receive said centering stabilizer;

a secondary housing configured and arranged to receive said trim lock; and a bridging portion configured and arranged to maintain said primary housing and said secondary housing in a fixed relationship with respect to each other.

9. The centering assembly according to claim 8, wherein:

said primary housing extends from a first axial end to a second axial end, and further wherein said second axial end of said stabilizer is rigidly connected to said second axial end of said primary housing; and said secondary housing extends from a first axial end to a second axial end, and further wherein said second axial end of said trim lock is rigidly connected to said second axial end of said secondary housing.

10. The centering assembly according to claim 9, wherein:

said primary housing comprises a first tube that is configured and arranged to receive at least a portion of said centering stabilizer therein; and said secondary housing comprises a second tube that is configured and arranged to receive at least a portion of said trim lock therein.

11. The centering assembly according to claim 8, wherein:

said primary housing comprises a first tube that is configured and arranged to receive at least a portion of said centering stabilizer therein; and said secondary housing comprises a second tube that is configured and arranged to receive at least a portion of said trim lock therein.

12. The centering assembly according to claim 8, wherein said bridging portion comprises a pair of legs that each extend between the primary housing and the secondary housing.

13. The centering assembly according to claim 8, wherein said bridging portion comprises a generally u-shaped member comprising a pair of legs extend from the secondary housing and a base section that at least partially surrounds a portion of the primary housing.

14. The centering assembly according to claim 8, wherein said mounting member comprises a hollow sleeve that is configured and arranged for slidably receiving a portion of said primary housing therein.

15. The centering assembly according to claim 7, wherein said mounting member comprises a hollow sleeve that is configured and arranged for slidably receiving a portion of said connecting unit therein.

16. The centering assembly according to claim 7, wherein an exposed length of a second shaft of said trim lock is adjustable via a Bowden cable.

17. The centering assembly according to claim 7, wherein an exposed length of a second shaft of said trim lock is electrically adjustable.

18. The centering assembly according to claim 7, wherein an exposed length of a second shaft of said trim lock is hydraulically adjustable.

19. The centering assembly according to claim 7, wherein said trim lock comprises:
- a first shaft extending in a first axial direction between a first end and a second end, wherein said first shaft includes a first aperture extending completely through said first shaft in said first axial direction;
- a second shaft extending in a second axial direction between a first end and a second end, wherein said second shaft includes a second aperture extending from said first end of said second shaft in said second axial direction;
- an intermediate member rigidly secured to both the second end of said first shaft and the first end of said second shaft, wherein said intermediate member includes a third aperture extending therethrough in a third axial direction, wherein said third axial direction, said second axial direction, and said first axial direction are all aligned with each other; and
- a spool valve piston seated within said first aperture, wherein said spool valve piston is configured and arranged for movement in said first axial direction with respect to said first shaft, wherein said spool valve piston includes a valve shaft and a land portion, and further wherein the land portion is of a larger diameter than the valve shaft;
- wherein said intermediate member is configured and arranged to define a first fluid filled chamber and a second fluid filled chamber within said a cover member, wherein said intermediate member is slidably positioned between said first fluid filled chamber and said second fluid filled chamber such that when said intermediate member slides in one direction an axial length of said first fluid filled chamber increases and an axial length of said second fluid filled chamber decreases and when said intermediate member slides in a direction opposite to the one direction, the axial length of said first fluid filled chamber decreases and the axial length of said second fluid filled chamber increases, and
- wherein said spool valve piston is configured and arranged to be moved between a closed position in which fluid communication between said first and second chambers is blocked and an open position in which fluid passes between said first and second chambers.

20. The centering assembly according to claim 7, wherein said trim lock comprises:
- a first shaft extending in a first axial direction between a first end and a second end, wherein said first shaft includes a first aperture extending completely through said first shaft in said first axial direction;
- a second shaft extending in a second axial direction between a first end and a second end, wherein said second shaft includes a second aperture extending from said first end of said second shaft in said second axial direction;
- an intermediate member rigidly secured to both the second end of said first shaft and the first end of said second shaft, wherein said intermediate member includes a third aperture extending therethrough in a third axial direction, wherein said third axial direction, said second axial direction, and said first axial direction are all aligned with each other;
- at least one first port formed within a first section of said intermediate member, wherein said at least one first port is in fluid communication with said third aperture;
- at least one second port formed within a second section of said intermediate member, wherein said at least one second port is in selective fluid communication with said third aperture;
- a spool valve piston seated within said first aperture, wherein said spool valve piston is configured and arranged for movement in said first axial direction with respect to said first shaft, wherein said spool valve piston includes a valve shaft and a land portion, and further wherein the land portion is of a larger diameter than the valve shaft;
- a push plug seated within said second aperture, wherein one end of said push plug is configured and arranged to make contact with one end of said spool valve piston;
- a biasing member seated within said second aperture, wherein said biasing member is configured and arranged to bias said spool valve piston; and
- a cover member including a first opening for slidably receiving said first shaft and a second opening for slidably receiving said second shaft,
- wherein said intermediate member is configured and arranged to define a first fluid filled chamber and a second fluid filled chamber within said cover member, wherein said intermediate member is slidably positioned between said first fluid filled chamber and said second fluid filled chamber such that when said intermediate member slides in one direction an axial length of said first fluid filled chamber increases and an axial length of said second fluid filled chamber decreases and when said intermediate member slides in a direction opposite to the one direction, the axial length of said first fluid filled chamber decreases and the axial length of said second fluid filled chamber increases, and
- wherein said spool valve piston is configured and arranged to be moved between a closed position in which said land portion is aligned with said at least one second port and fluid communication between said first and second chambers is blocked and an open position in which said land portion is out of alignment with said at least one second potion and fluid passes between said first and second chambers.

* * * * *